US012213072B2

(12) United States Patent
Seo et al.

(10) Patent No.: US 12,213,072 B2
(45) Date of Patent: Jan. 28, 2025

(54) METHOD FOR OPERATING DISCONTINUOUS RECEPTION OF TERMINAL IN WIRELESS COMMUNICATION SYSTEM, AND APPARATUS USING SAME METHOD

(71) Applicant: LG ELECTRONICS INC., Seoul (KR)

(72) Inventors: Inkwon Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 497 days.

(21) Appl. No.: 17/291,300

(22) PCT Filed: Nov. 11, 2019

(86) PCT No.: PCT/KR2019/015271
§ 371 (c)(1),
(2) Date: May 5, 2021

(87) PCT Pub. No.: WO2020/096436
PCT Pub. Date: May 14, 2020

(65) Prior Publication Data
US 2022/0007289 A1 Jan. 6, 2022

(30) Foreign Application Priority Data

Nov. 9, 2018 (KR) .................. 10-2018-0137583
Nov. 9, 2018 (KR) .................. 10-2018-0137589

(51) Int. Cl.
*H04W 52/02* (2009.01)
*H04W 72/044* (2023.01)
(Continued)

(52) U.S. Cl.
CPC ... *H04W 52/0232* (2013.01); *H04W 72/0446* (2013.01); *H04W 72/0453* (2013.01); *H04W 72/23* (2023.01); *H04W 76/28* (2018.02)

(58) Field of Classification Search
CPC ..... H04W 76/20–28; H04W 88/00–06; H04W 8/00–245
See application file for complete search history.

(56) References Cited

U.S. PATENT DOCUMENTS

2013/0242818 A1* 9/2013 Heo ................. H04L 1/1887
370/280
2014/0286240 A1* 9/2014 Kim ................. H04L 5/001
370/328

(Continued)

FOREIGN PATENT DOCUMENTS

KR 1020180018455 2/2018
KR 1020180080967 7/2018

OTHER PUBLICATIONS

Ericsson, On DRX for NTN, R2-1817750, 3GPP TSG-RAN WG2 #104, Spokane, US, Nov. 2, 2018, See sections 2-2.3.

(Continued)

*Primary Examiner* — San Htun
(74) *Attorney, Agent, or Firm* — BRYAN CAVE LEIGHTON PAISNER LLP

(57) ABSTRACT

Provided are a method for operating discontinuous reception (DRX) of a terminal in a wireless communication system, and an apparatus using same method. The terminal receives a plurality of DRX settings from a base station, and operates the DRX on the basis of one selected DRX setting from among the plurality of DRX settings, wherein the one DRX setting includes a plurality of parameters, and a specific (Continued)

parameter among the plurality of parameters has a plurality of setting values, and the other parameters respectively have one setting value.

5 Claims, 30 Drawing Sheets

(51) Int. Cl.
*H04W 72/0446* (2023.01)
*H04W 72/0453* (2023.01)
*H04W 72/23* (2023.01)
*H04W 76/28* (2018.01)

(56) References Cited

U.S. PATENT DOCUMENTS

| | | | |
|---|---|---|---|
| 2015/0245295 A1* | 8/2015 | Jha | H04W 76/28 370/311 |
| 2016/0192433 A1* | 6/2016 | Deenoo | H04W 24/08 370/329 |
| 2017/0251521 A1 | 8/2017 | Wei | |
| 2019/0098689 A1* | 3/2019 | Wei | H04W 76/28 |
| 2020/0045768 A1* | 2/2020 | He | H04W 52/0229 |

OTHER PUBLICATIONS

Nokia et al., On UE Power Saving Triggering Mechanisms for Rel-16 NR, R1-1811480, 3GPP TSG RAN WG1 Meeting #94-bis, Chengdu, People's Republic of China, Sep. 28, 2018, See section 2.2.

* cited by examiner

METHOD FOR OPERATING DISCONTINUOUS RECEPTION OF TERMINAL IN WIRELESS COMMUNICATION SYSTEM, AND APPARATUS USING SAME METHOD

This application is the National Stage filing under 35 U.S.C. 371 of International Application No. PCT/KR2019/015271, filed on Nov. 11, 2019, which claims priority to Korean Patent Application No. 10-2018-0137583, filed on Nov. 9, 2018 and 10-2018-0137589, filed on Nov. 9, 2018, the contents of which are hereby incorporated by reference herein in their entirety.

BACKGROUND OF THE DISCLOSURE

Field of the Disclosure

The present disclosure relates to wireless communication, and more particularly, to a method for discontinuous reception operation of a user equipment (UE) in a wireless communication system, and an apparatus using the method.

Related Art

Wireless communication systems are widely spread all over the world to provide various types of communication services such as voice or data. In general, the wireless communication system is a multiple access system capable of supporting communication with multiple users by sharing available system resources (e.g., a bandwidth, transmit power, or the like). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, or the like.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

A discontinuous reception (DRX) operation may also be introduced in the NR to reduce power consumption of a UE. In the past, a configuration of the DRX operation was provided to the UE by using a higher layer signal, and when it is intended to change the existing DRX configuration, a new DRX configuration was provided through a reconfiguration by using the higher layer signal. However, the conventional method has difficulty in performing an adaptive DRX operation according to a change in a UE situation.

SUMMARY

The present disclosure provides a method for discontinuous reception operation of a user equipment (UE) in a wireless communication system, and an apparatus using the method.

In one aspect, provided is a method for discontinuous reception (DRX) operation of a user equipment (UE) in a wireless communication system. The method includes receiving a plurality of DRX configurations from a base station and performing the DRX operation, based on one DRX configuration selected from the plurality of DRX configurations. The one DRX configuration includes a plurality of parameters, and a specific parameter among the plurality of parameters has a plurality of setting values and the other parameters have one setting value.

In another aspect, provided is a user equipment (UE). The UE includes a transceiver transmitting and receiving a radio signal and a processor operatively coupled with the transceiver. The processor is configured to: receive a plurality of discontinuous reception (DRX) configurations from a base station and perform the DRX operation, based on one DRX configuration selected from the plurality of DRX configurations. The one DRX configuration includes a plurality of parameters, and a specific parameter among the plurality of parameters has a plurality of setting values and the other parameters have one setting value.

In still another aspect, provided is a processor for a wireless communication device, configured to control the wireless communication device to receive a plurality of discontinuous reception (DRX) configurations from a base station, and perform the DRX operation, based on one DRX configuration selected from the plurality of DRX configurations. The one DRX configuration includes a plurality of parameters, and a specific parameter among the plurality of parameters has a plurality of setting values and the other parameters have one setting value.

In NR which uses a broadband and has a variety of services provided by a UE, a DRX operation can be adaptively performed according to a situation of each UE. Therefore, power consumption of the UE can be significantly reduced.

DESCRIPTION OF EXEMPLARY EMBODIMENTS

In the specification described below, the term "I" and "," should be interpreted to indicate "and/or". For instance, the expression "A/B" may mean "A and/or B". "A, B" may mean "A and/or B". "A/B/C" may mean "at least one of A, B, and/or C". "A, B, C" may mean "at least one of A, B, and/or C".

In the specification described below, the term "or" should be interpreted to indicate "and/or". For instance, the expression "A or B" may include "only A", "only B", and/or "both A and B". In other words, in the specification described below, the term "or" should be interpreted to indicate "additionally or alternatively".

Figure 1:
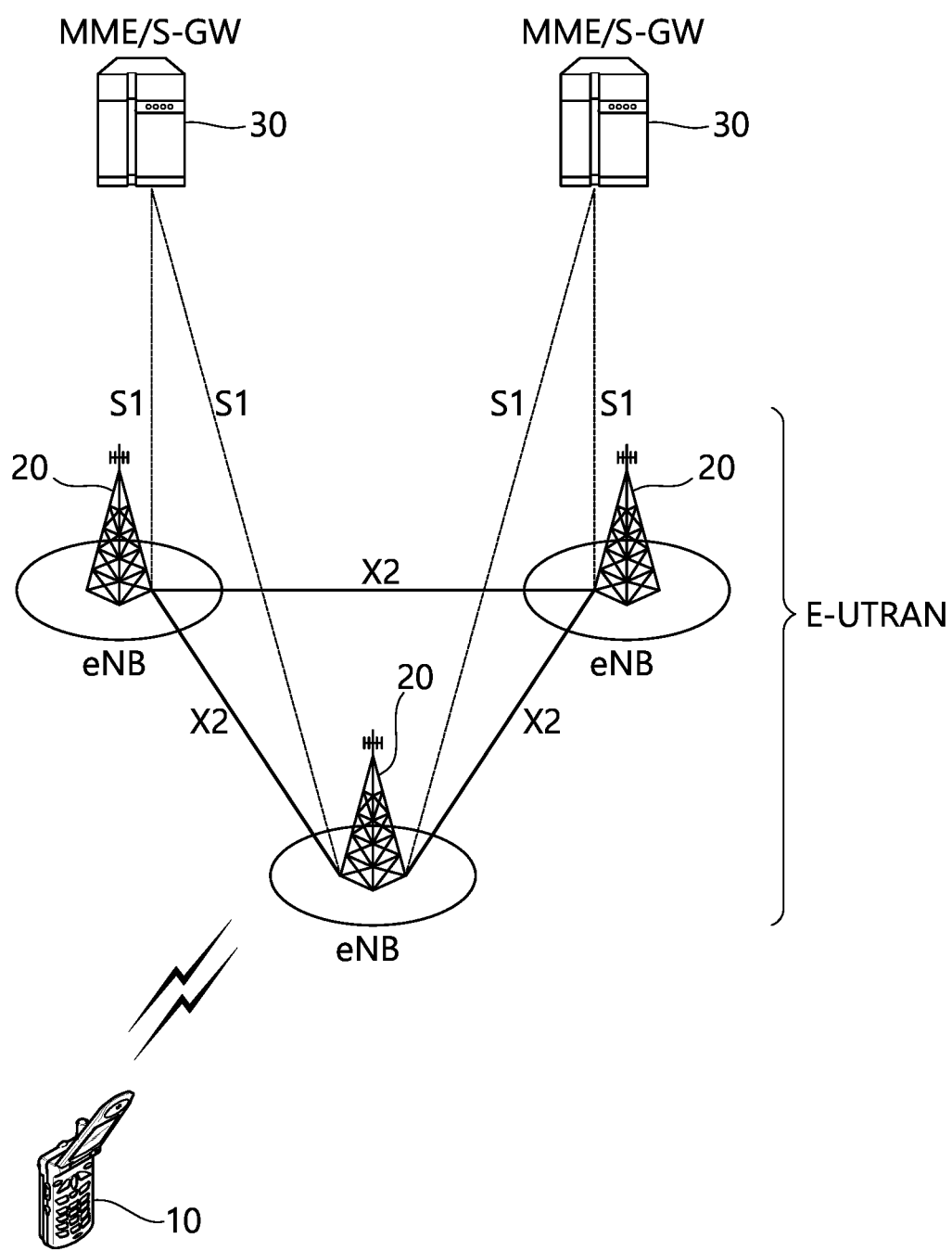
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
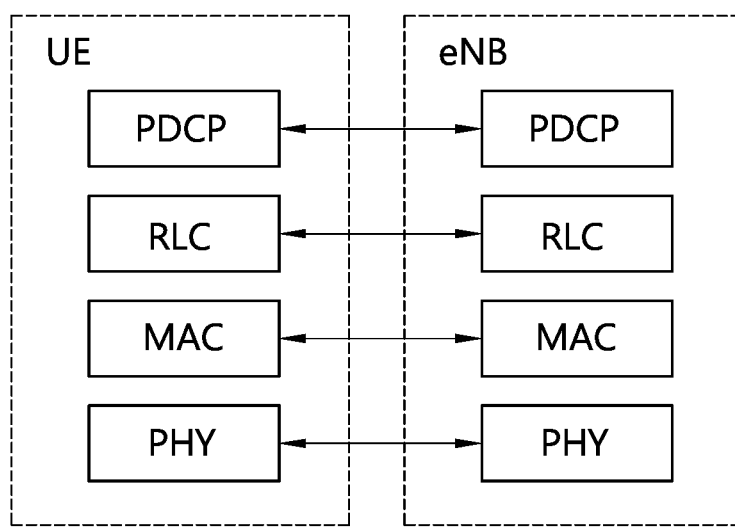
FIG. 2 is a diagram showing a wireless protocol architecture for a user plane.
Figure 3:
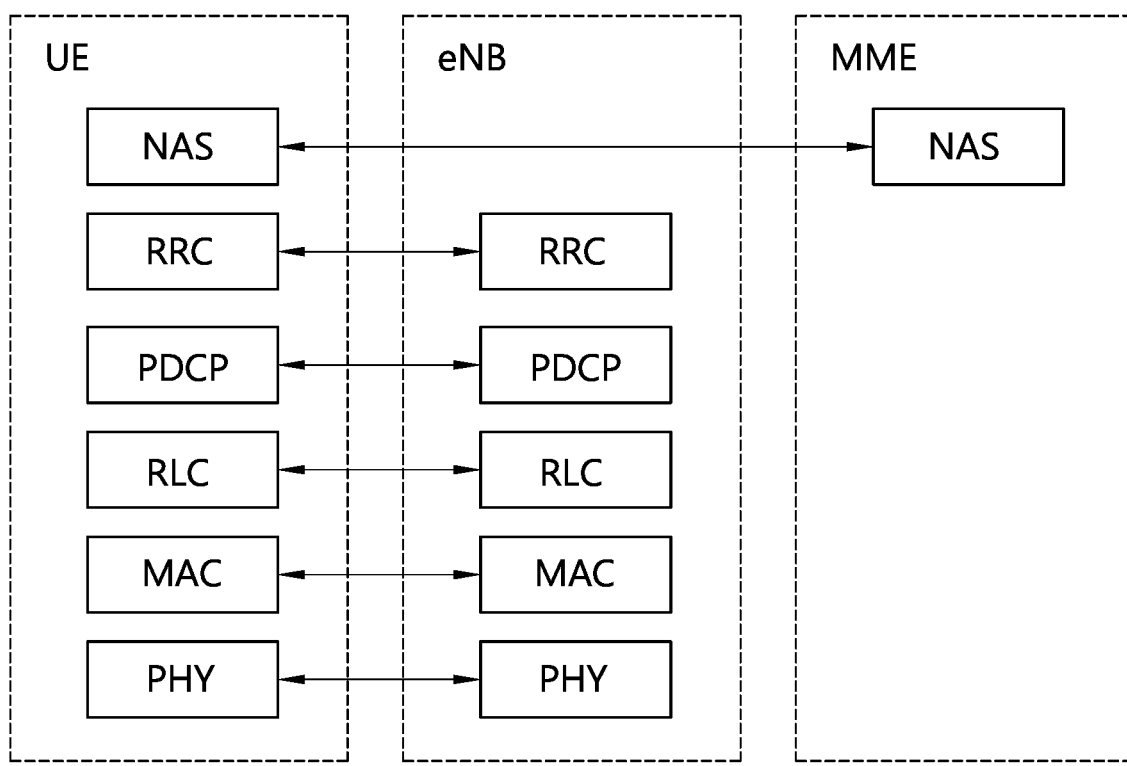
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission and may be a subframe or a slot, for example.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
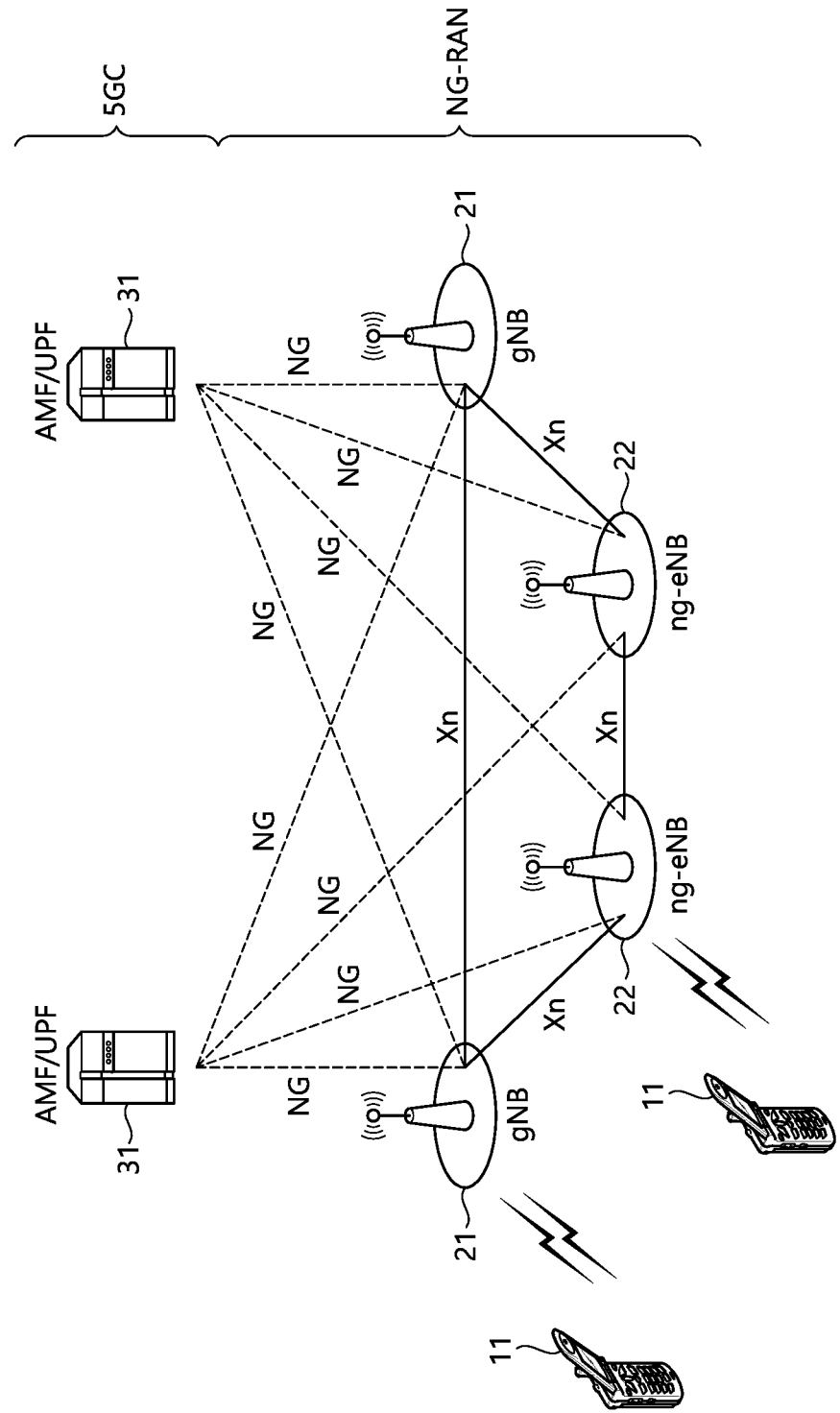
FIG. 4 illustrates another wireless communication system to which the technical features of the present disclosure may be applied.

FIG. 4 shows another example of a wireless communication system to which a technical feature of the present disclosure can be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a $5^{th}$ generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
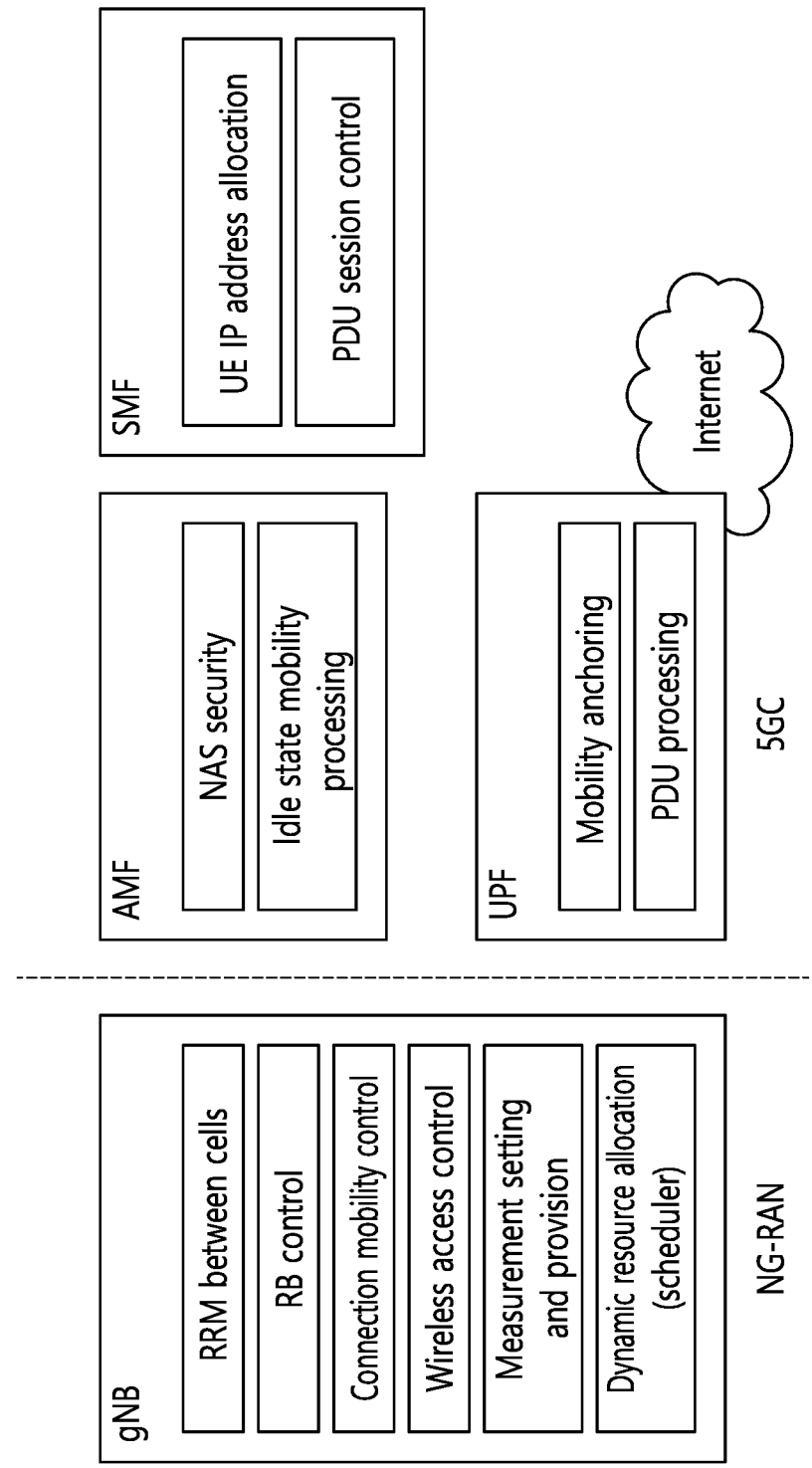
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
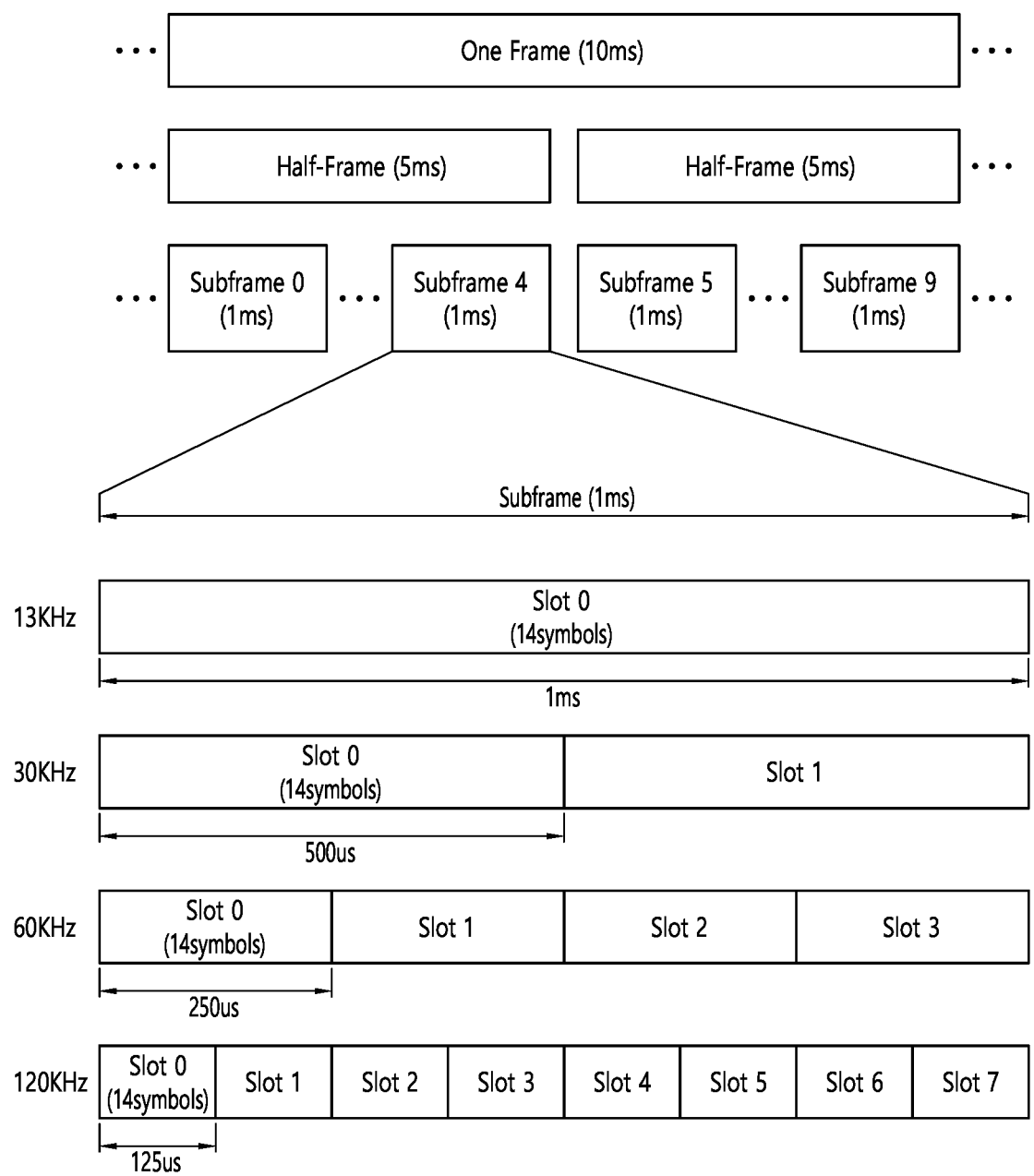
FIG. 6 illustrates an example of a frame structure that may be applied in NR.

FIG. 6 illustrates a frame structure applicable in NR.

Referring to FIG. 6, a frame may be configured to have a length of 10 millisecond (ms), and may include 10 subframes each having a length of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in the SF according to a subcarrier spacing.

The following table 1 illustrates a subcarrier spacing configuration u.

TABLE 1

| μ | Δf = $2^μ$ · 15[kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,μ}_{slot}$), the number of slots in a subframe ($N^{subframe,μ}_{slot}$), the number of symbols in a slot ($N^{slot}_{symb}$), and the like, according to subcarrier spacing configurations μ.

TABLE 2

| μ | $N^{slot}_{symb}$ | $N^{frame,μ}_{slot}$ | $N^{subframe,μ}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2-1 below illustrates that the number of symbols per slot, the number of slots per frame, and the number of slots per subframe vary depending on the SCS, in case of using an extended CP.

TABLE 2-1

| SCS(15 * $2^μ$) | $N^{slot}_{symb}$ | $N^{frame,u}_{slot}$ | $N^{subframe,u}_{slot}$ |
|---|---|---|---|
| 60 KHz (μ = 2) | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
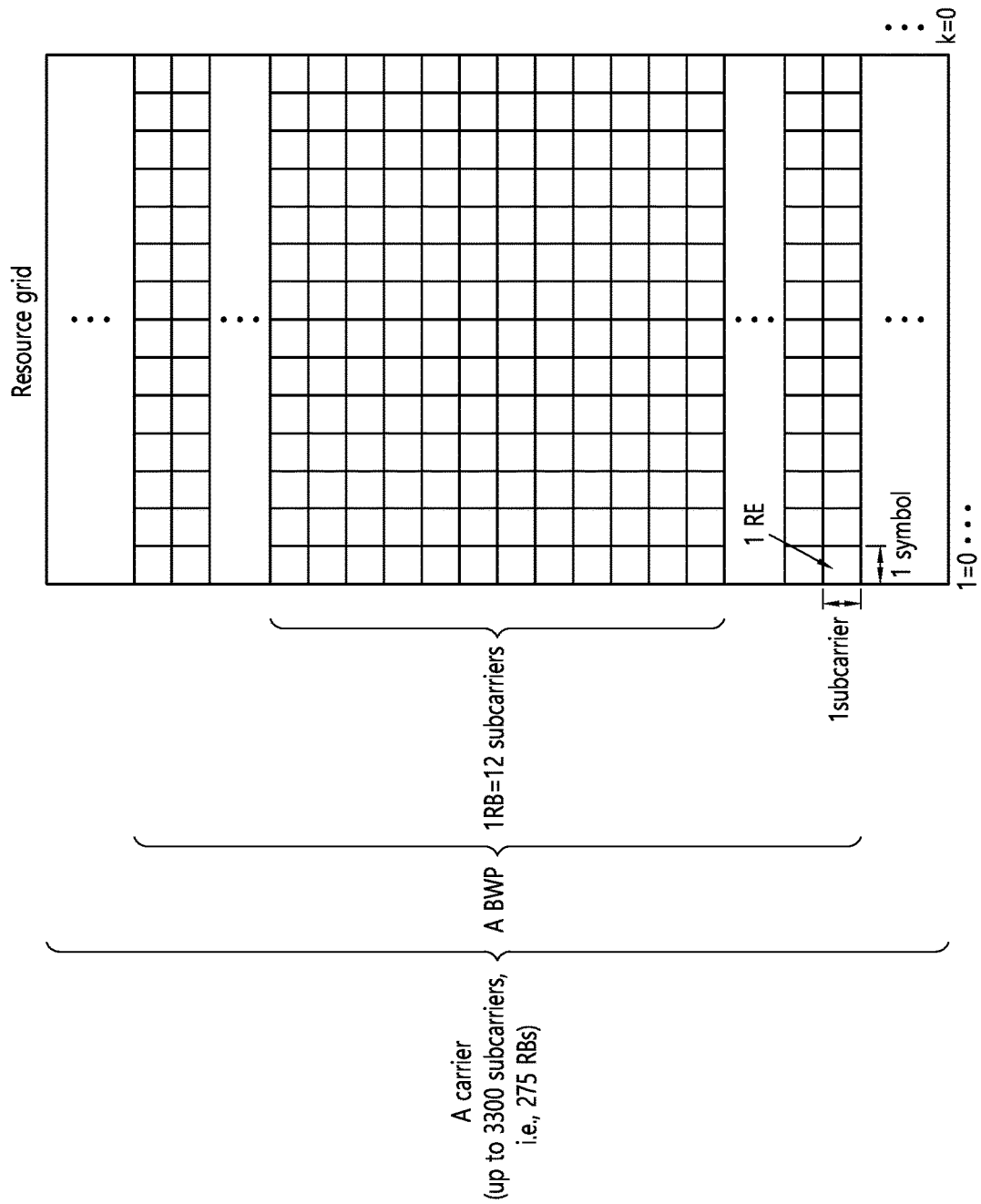
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Figure 8:
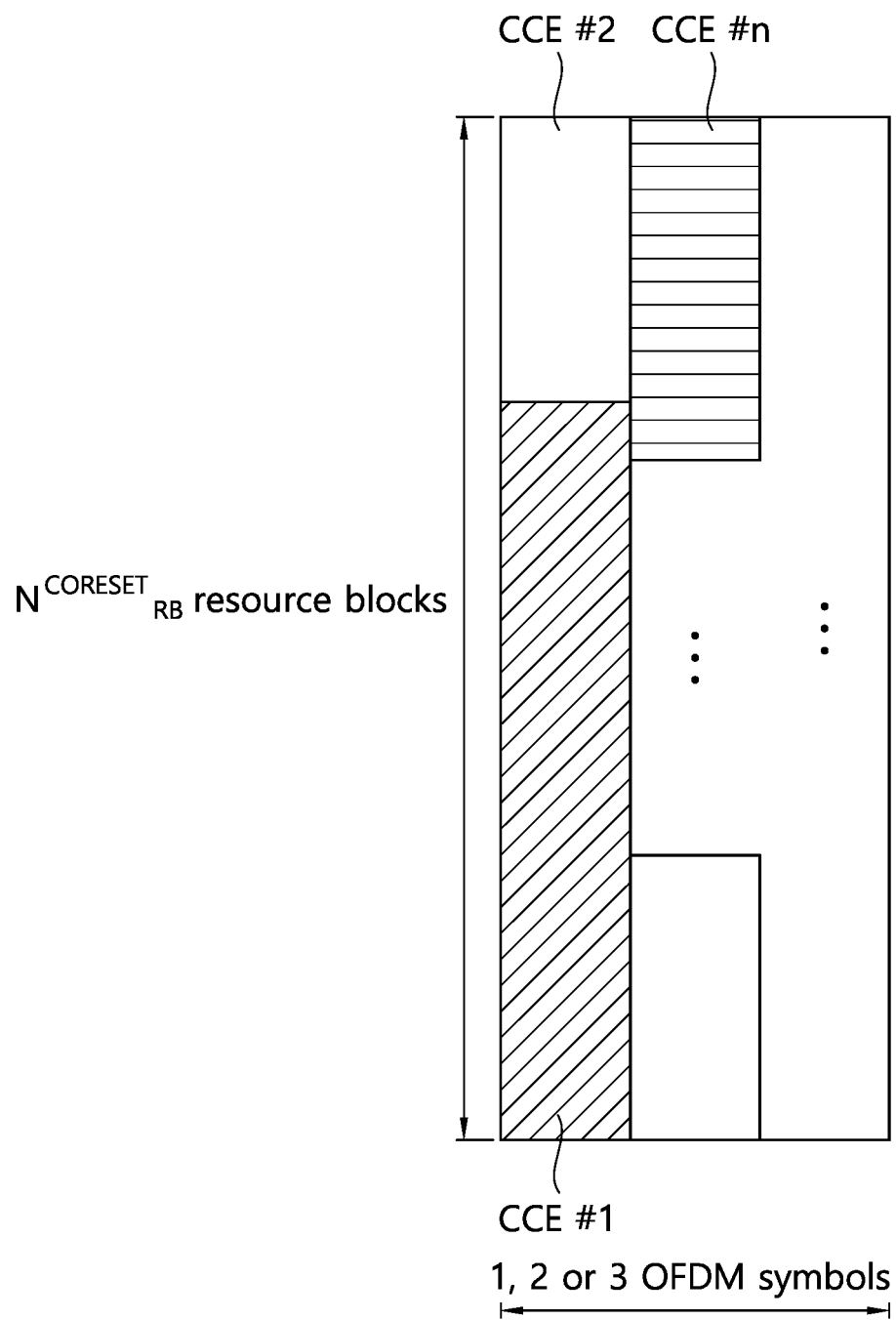
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 9:
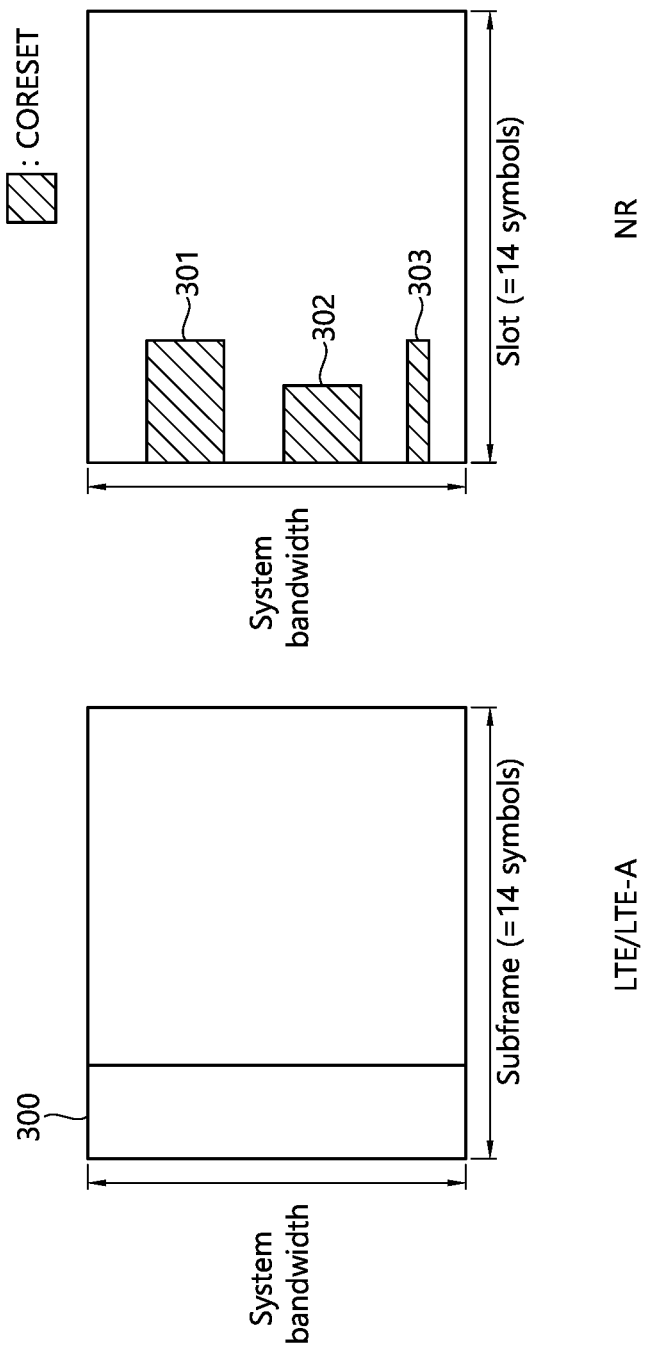
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
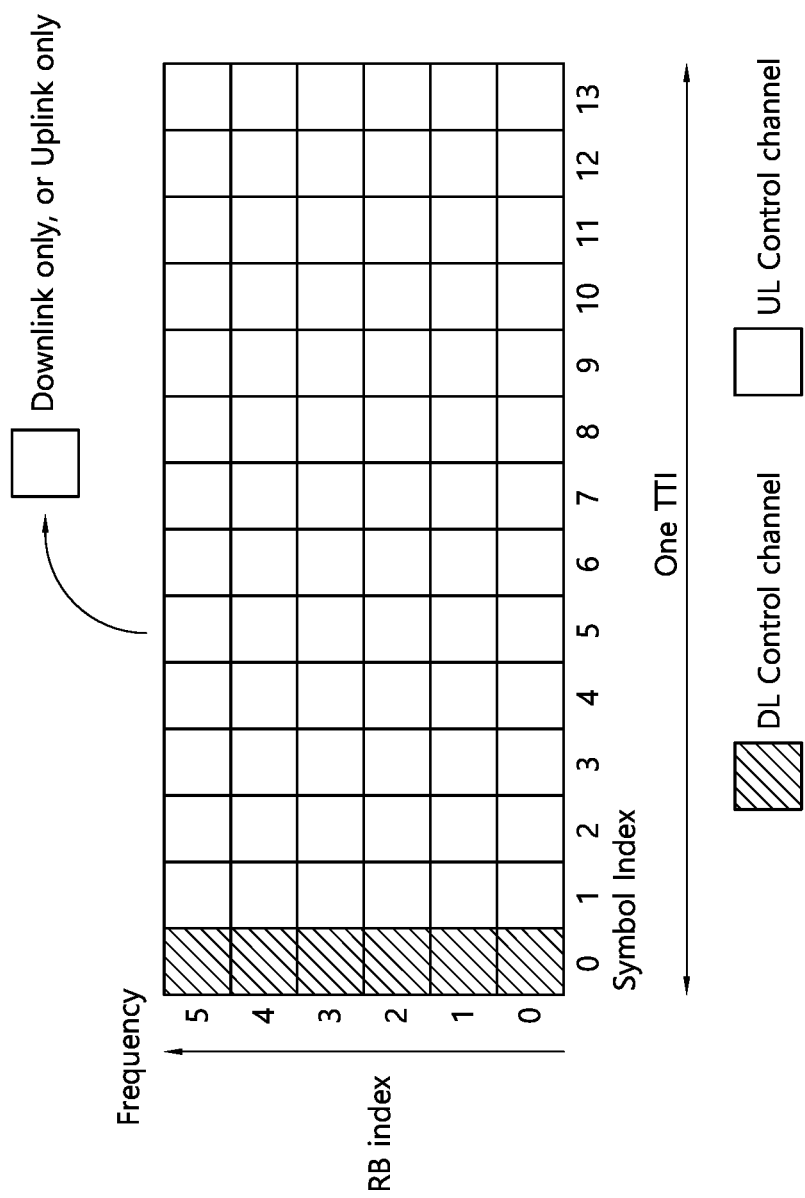
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
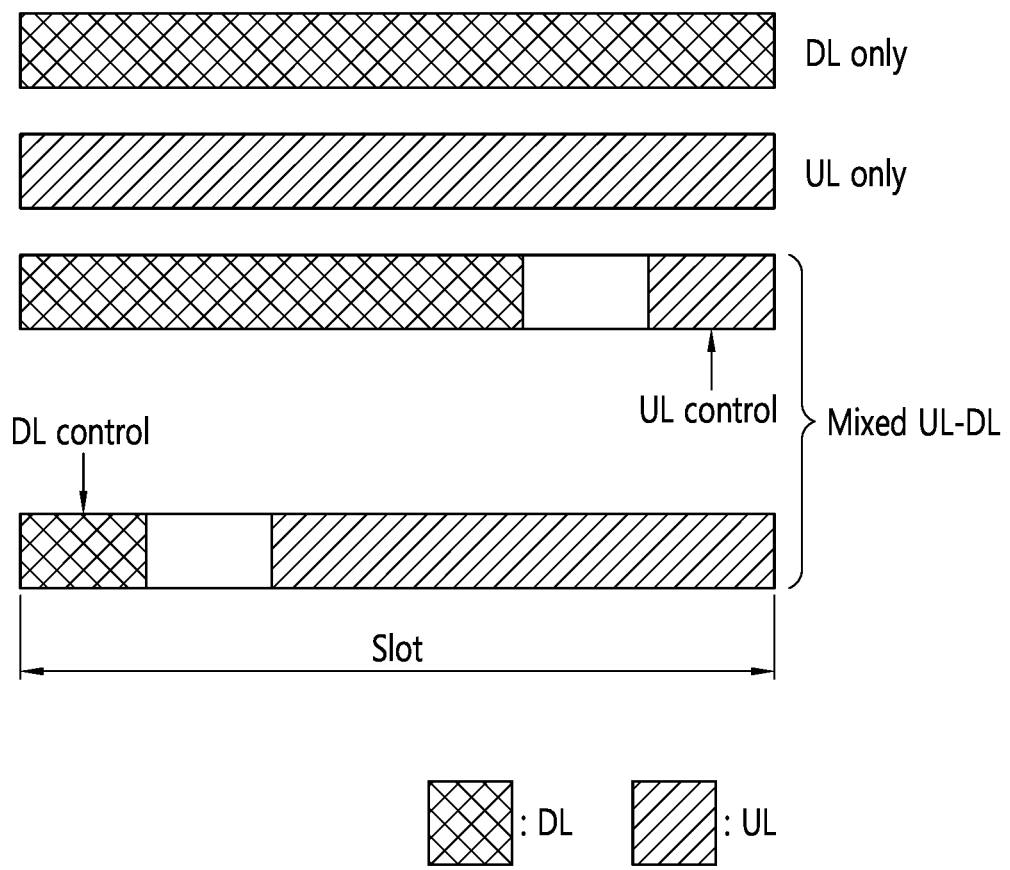
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
   DL region+Guard period (GP)+UL control region
   DL control region+GP+UL region Here, DL region may be (i) DL data region, (ii) DL control region+DL data region. UL region may be (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
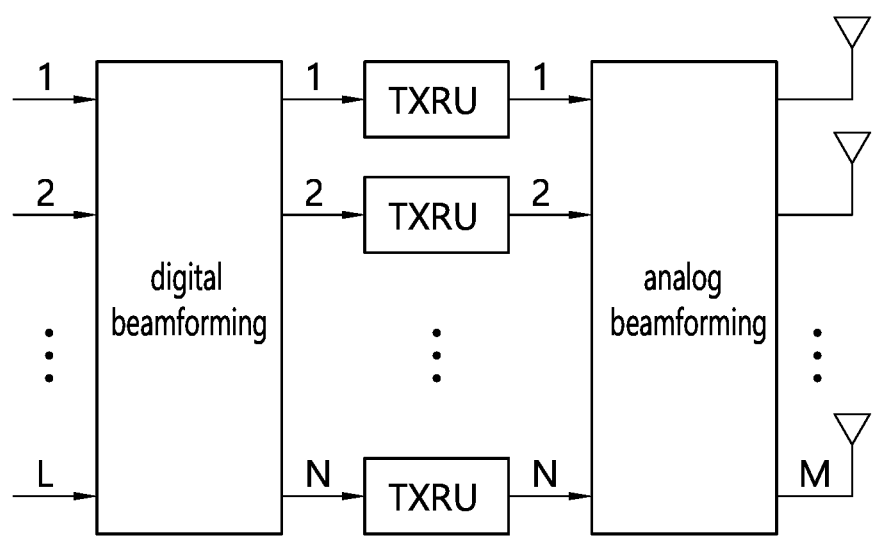
FIG. 12 is an abstract schematic diagram illustrating hybrid beamforming from the viewpoint of TXRUs and physical antennas.

FIG. 12 is an abstract schematic diagram illustrating hybrid beamforming from the viewpoint of TXRUs and physical antennas.

In FIG. 12, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 12, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 13:
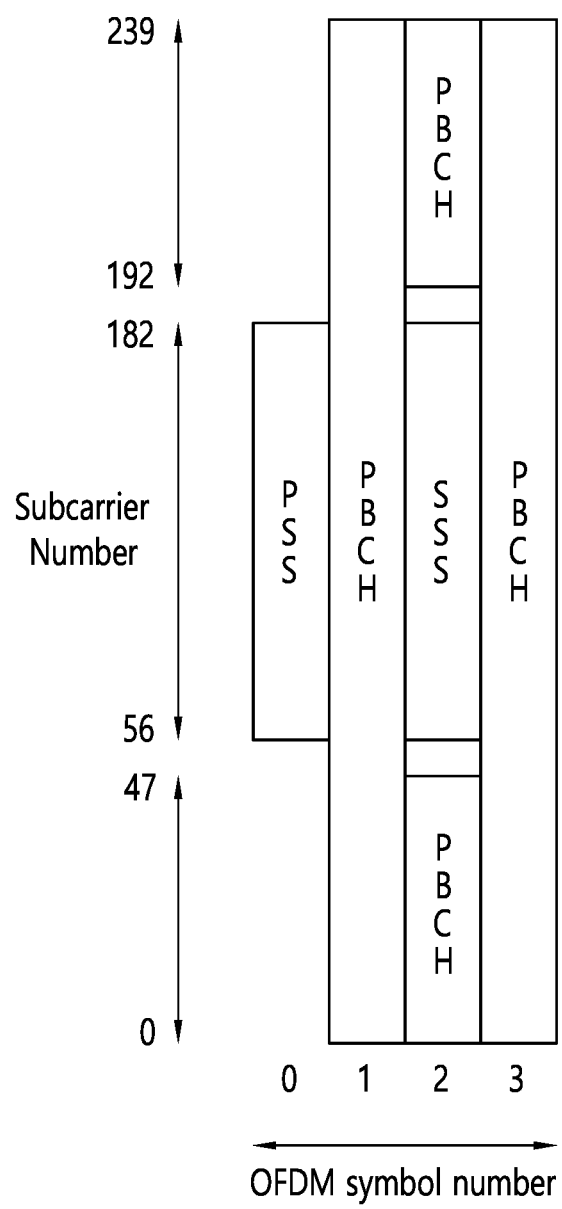
FIG. 13 schematically illustrates a synchronization signal/PBCH (SS/PBCH) block.

FIG. 13 schematically illustrates a synchronization signal/PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A—Subcarrier spacing of 15 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by {4, 8, 16, 20}+28*n where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by {4, 8, 16, 20}+28*n where n=0, 1, 2, 3, 5, 6, 7, 8, 10, 11, 12, 13, 15, 16, 17, 18 for a carrier frequency greater than 6 GHz.

Case E—Subcarrier spacing of 240 kHz: The first symbols of the candidate SS/PBCH blocks have an index represented by {8, 12, 16, 20, 32, 36, 40, 44}+56*n where n=0, 1, 2, 3, 5, 6, 7, 8 for a carrier frequency greater than 6 GHz.

The candidate SS/PBCH blocks in the half frame are indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 14:
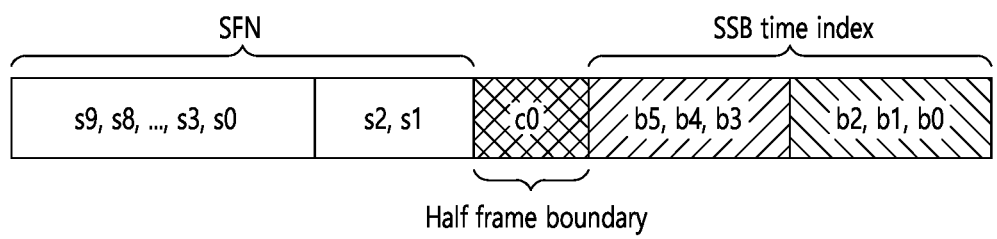
FIG. 14 illustrates a method for a UE to obtain timing information.

FIG. 14 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHz, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHz).

In initial cell selection, the UE may assume that a half frame having SS/PBCH blocks occurs with a periodicity of two frames. Upon detecting an SS/PBCH block, when $k_{SSB} \leq 23$ for FR1 and $k_{SSB} \leq 11$ for FR2, the UE determines that a control resource set for a Type0-PDCCH common search space exists. When $k_{SSB} > 23$ for FR1 and $k_{SSB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIB s) where:

the MIB is transmitted always on a BCH according to a period of 80 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIB s) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
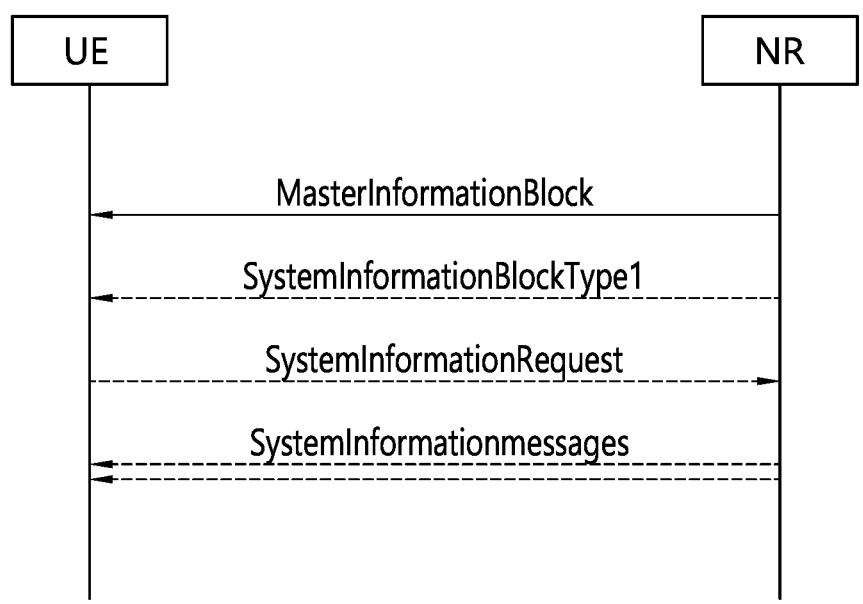
FIG. 15 illustrates an example of a system information acquisition process of a UE.

FIG. 15 illustrates an example of a system information acquisition process of a UE.

Referring to FIG. 15, the UE may receive an MIB from a network and may then receive SIB 1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 4.

TABLE 4

| | Type of signal | Operation/obtained information |
|---|---|---|
| Step 1 | Uplink PRACH preamble | To obtain initial beam Random election of RA-preamble ID |
| Step 2 | Random access response on DL-SCH | Timing alignment information RA-preamble ID Initial uplink grant, temporary C-RNTI |
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 16:
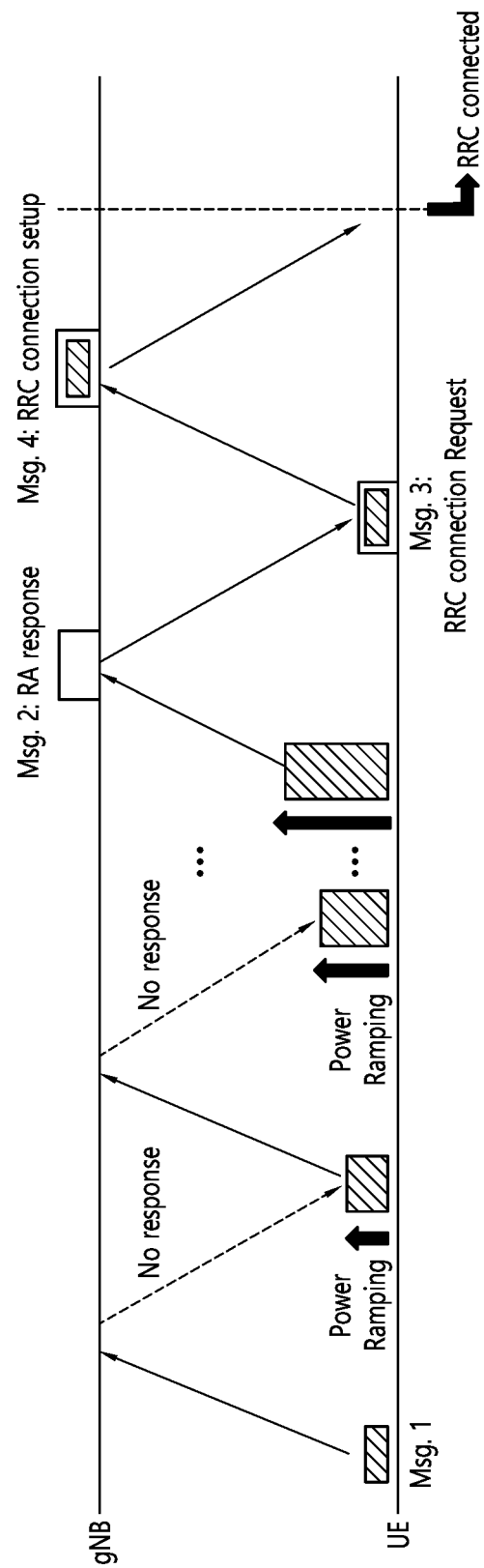
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
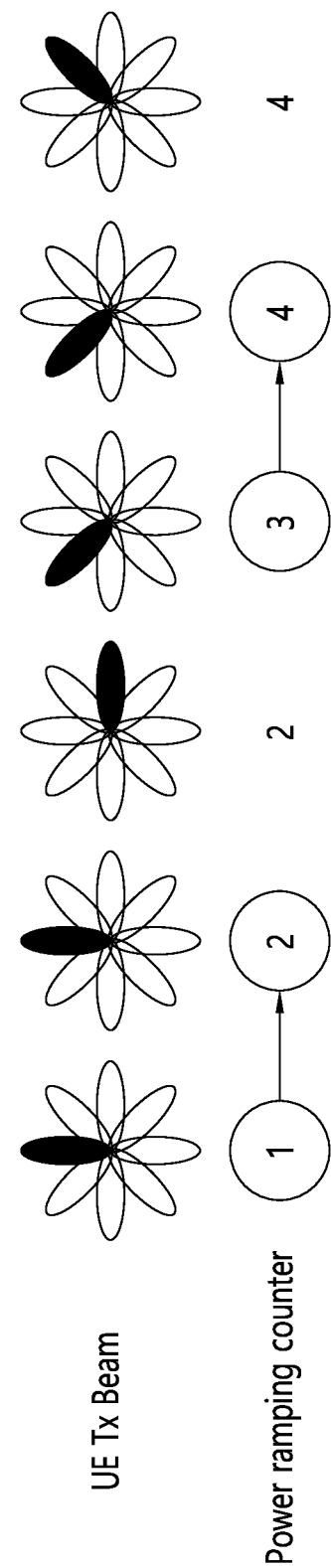
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
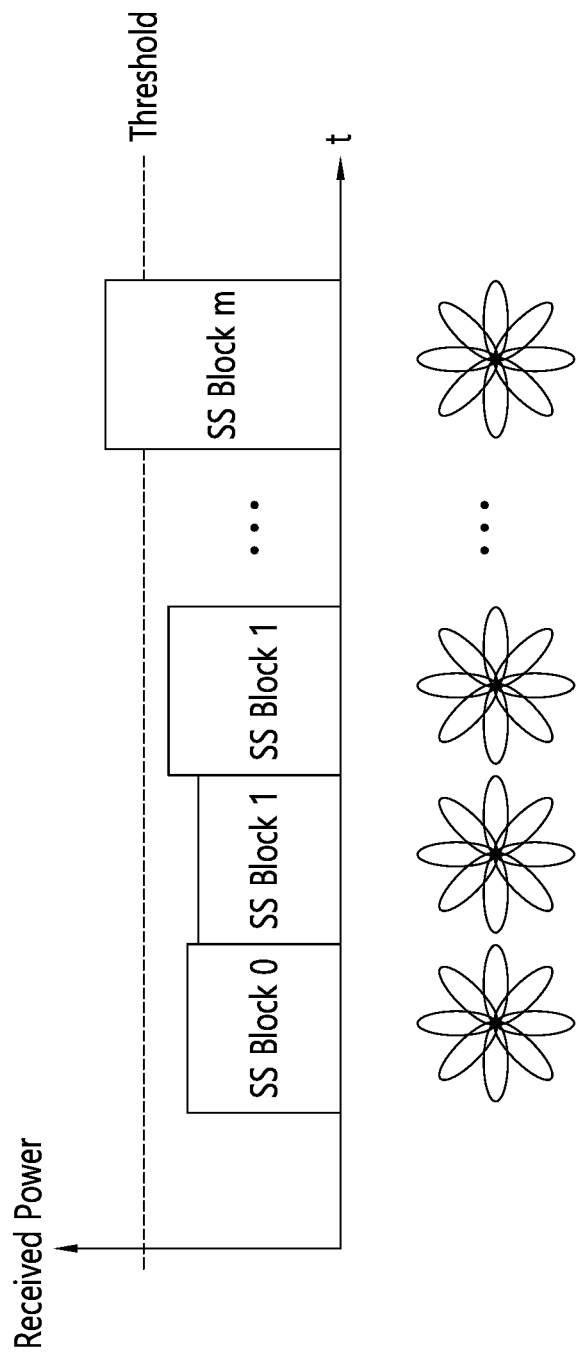
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with(=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

<Discontinuous Reception (DRX)>

Discontinuous reception (DRX) refers to an operation mode that enables a UE to reduce battery consumption and to discontinuously receive a downlink channel That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC)_IDLE state (or mode), RRC_INACTIVE state (or mode), or RRC_CONNECTED state (or mode). In the RRC_IDLE state and the RRC_INACTIVE state, DRX may be used to discontinuously receive a paging signal.

RRC_IDLE state: State in which a wireless connection (RRC connection) is not established between a base station and a UE.

RRC_INACTIVE state: State in which a wireless connection (RRC connection) is established between a base station and a UE but is deactivated.

RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 19:
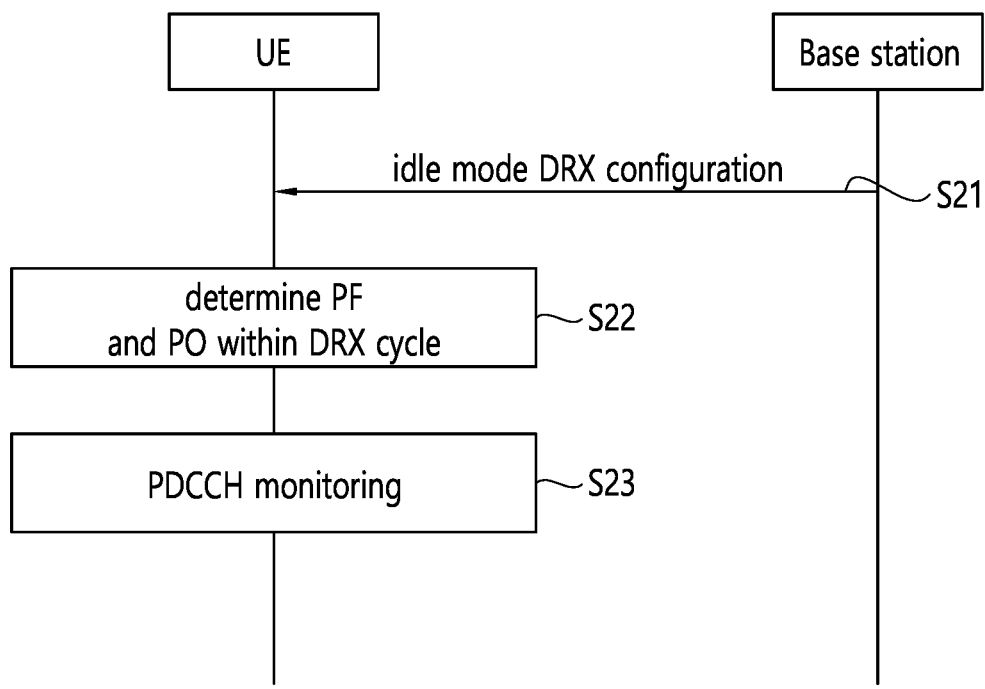
FIG. 19 is a flowchart illustrating an example of performing an idle-mode DRX operation.

FIG. 19 is a flowchart illustrating an example of performing an idle-mode DRX operation.

Referring to FIG. 19, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 20:
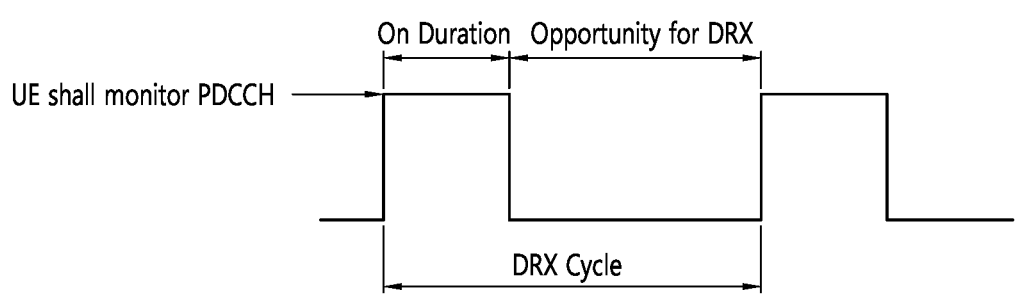
FIG. 20 illustrates a DRX cycle.

FIG. 20 illustrates a DRX cycle.

Referring to FIG. 20, the DRX cycle includes an 'on duration (hereinafter, also referred to as a 'DRX-on duration') and an 'opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends. Therefore, when the DRX is configured, in the performing of the procedure and/or methods described/proposed above, PDCCH monitoring/reception may be performed discontinuously in a time domain. For example, when the DRX is configured, in the present disclosure, a PDCCH reception occasion (e.g., a slot having a PDCCH search space) may be configured discontinuously according to the DRX configuration. Otherwise, if the DRX is not configured, in the performing of the procedure and/or methods described/proposed above, PDCCH monitoring/reception may be performed continuously in the time domain. For example, when the DRX is not configured, in the present disclosure, a PDCCH reception occasion (e.g., a slot having a PDCCH search space) may be configured continuously. Meanwhile, regardless of whether the DRX is configured, PDCCH monitoring may be restricted in a duration configured as a measurement gap.

Table 5 shows a UE procedure related to DRX (RRC_CONNECTED state). Referring to Table 5, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 5

| | Type of signals | UE procedure |
|---|---|---|
| 1$^{st}$ step | RRC signaling (MAC-CellGroupConfig) | Receive DRX configuration information |
| 2$^{nd}$ step | MAC CE ((Long) DRX command MAC CE) | Receive DRX command |
| 3$^{rd}$ step | — | Monitor a PDCCH during an on-duration of DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

- Value of drx-OnDurationTimer: This defines a length of a starting duration of a DRX cycle. It may be a timer related to a DRX-on duration.
- Value of drx-InactivityTimer: This defines a length of a time duration in which the UE is in an awake state, after a PDCCH occasion in which a PDCCH indicating initial UL or DL data is detected.
- Value of drx-HARQ-RTT-TimerDL: This defines a length of a maximum time duration until DL retransmission is received, after DL initial transmission is received.
- Value of drx-HARQ-RTT-TimerDL: This defines a length of a maximum time duration until a grant for UL retransmission is received, after a grant for UL initial transmission is received.
- drx-LongCycleStartOffset: This defines a time length and a starting point of a DRX cycle
- drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awake state.

In a wireless communication system, such as LTE and NR, the DRX operation was introduced to reduce power consumption of a UE by providing a duration in which the UE does not perform DL/UL transmission. A parameter signaled for the DRX operation has already been described, and if necessary, will be described again below.

Figure 21:
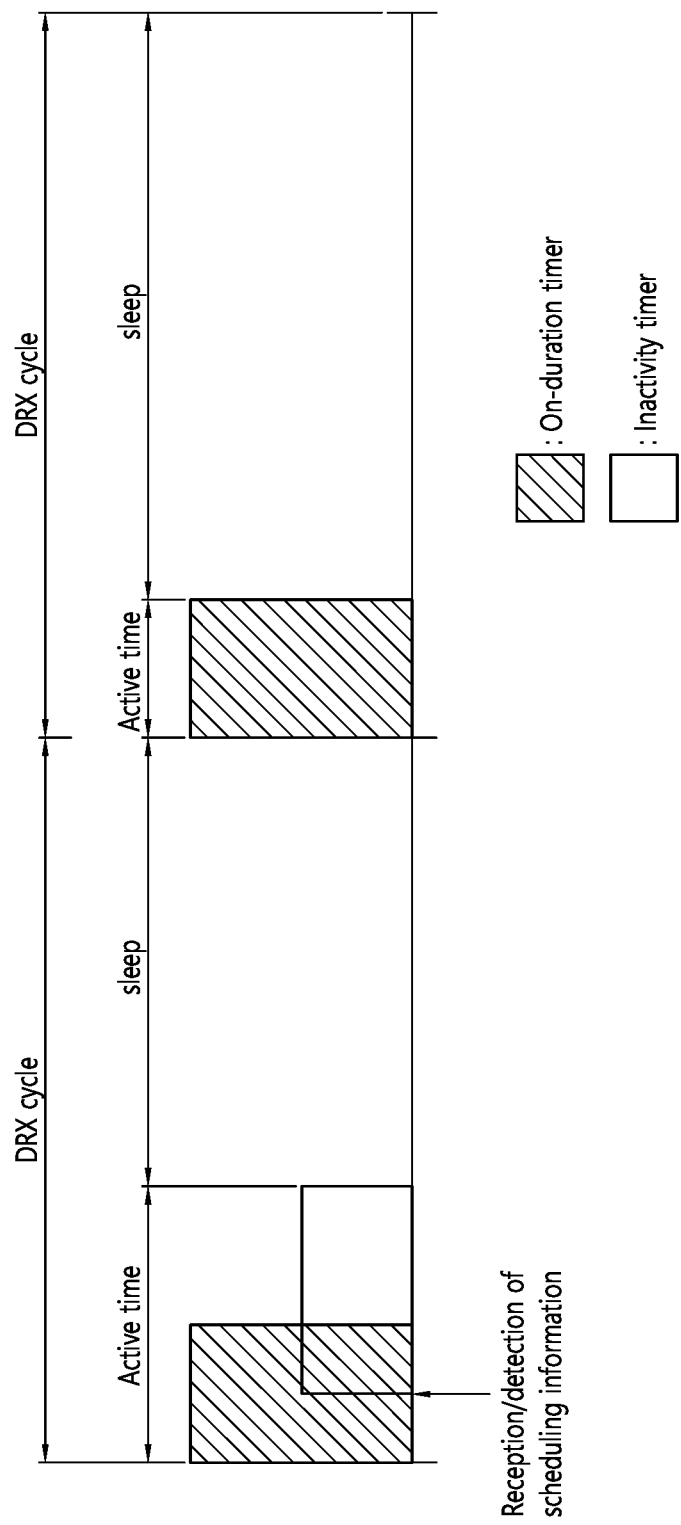
FIG. 21 illustrates an example of a DRX operation.

FIG. 21 illustrates an example of a DRX operation.

Referring to FIG. 21, the UE can know a starting point of a DRX cycle, a duration (duration time) of the DRX cycle, a starting point of an on-duration timer, and a duration of the on-duration timer according to a DRX configuration. Thereafter, the UE attempts reception/detection for scheduling information (i.e., PDCCH) within the on-duration of each DRX cycle (this may be represented that scheduling information is monitored).

If the scheduling information (PDCCH) is detected within the on-duration of the DRX cycle (DRX-on duration), an inactivity timer is activated, and detection is attempted for another scheduling information during a given inactivity timer duration (a time duration in which the inactivity timer runs). In this case, the on-duration and the inactivity timer duration in which the UE performs the signal reception/detection operation may be together referred to as an active time. If the scheduling information is not detected in the on-duration, only the on-duration may be the active time.

When the inactivity timer ends without reception/detection of an additional signal (a control signal or data), the UE does not perform scheduling information and corresponding DL reception/UL transmission until an on-duration of a next DRX cycle (a DRX on duration) starts after the inactivity timer ends (the time interval indicated by sleep in FIG. 21).

A duration adjustment of a DRX cycle, a duration adjustment of an on-duration timer/inactivity timer, or the like plays an important role in determining whether the UE sleeps. According to the setting for a corresponding parameter, the network may configure the UE to frequently sleep or continuously perform monitoring on the scheduling information. This may act as an element for determining whether power saving of the UE will be achieved.

The DRX configuration for the DRX operation may be transferred to the UE through RRC signaling or the like, and a new configuration may be applied through a reconfiguration or the like using the RRC signaling. However, according to this method, it may be difficult to dynamically adapt the DRX configuration based on a situation of the UE. Therefore, an additional method for dynamically adjusting power consumption of the UE may be required to support various services.

The present disclosure proposes to dynamically change/apply the DRX configuration, and proposes a method of operating an adaptive DRX operation.

<Multiple DRX Configurations>

A network may signal multiple (a plurality of) DRX configurations to a UE in advance, and may instruct to apply a specific configuration among the plurality of DRX configurations at a specific time point. A parameter included in the DRX configuration may include, for example, at least one of the following parameters. For some or all of the following parameters, multiple configurations, i.e., a plurality of configurations, may be indicated to the UE.

Figure 22:
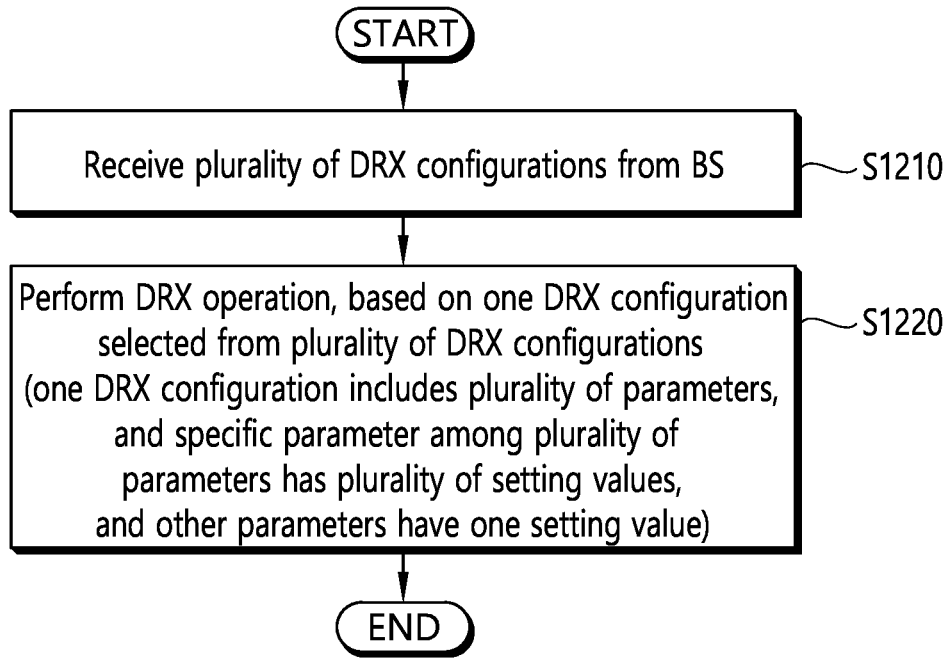
FIG. 22 illustrates a DRX operation method of a UE.

FIG. 22 illustrates a method for DRX operation of a UE.

Referring to FIG. 22, the UE receive a plurality of DRX configurations from a BS (S1210).

The UE performs the DRX operation, based on one DRX configuration selected from the plurality of DRX configurations (S1220). The one DRX configuration may include a plurality of parameters. A specific parameter among the plurality of parameters may have a plurality of setting values, and the other parameters may have one setting value.

A state of the UE may be a power saving state and/or a normal state. In this case, the UE may select a setting value determined according to the state of the UE among the plurality of setting values as a value of the specific parameter.

The specific parameter may be a parameter indicating a timer value related to a DRX on-duration or a parameter indicating an inactivity timer value. The inactivity timer may be a timer which is activated upon detecting scheduling information in the DRX on-duration and runs during an inactive duration. The UE may monitor another scheduling information in the inactive duration.

Alternatively, the UE may further receive a signal indicating which setting value is to be used among the plurality of setting values.

A first DRX configuration among the plurality of DRX configurations is applied to a first DRX cycle including an active time and a sleep time. The active time may include a DRX on-duration and a time during which an inactivity timer runs.

Now, each step of FIG. 22 will be described in greater detail.

The DRX configuration may have the following parameters, and the BS may control the DRX operation by configuring the following parameters through RRC signaling.

1) 'drx-onDurationTimer': the duration at the beginning of a DRX cycle
2) 'drx-SlotOffset': the delay before starting the drx-onDurationTimer
3) 'drx-InactivityTimer': the duration after the PDCCH occasion in which a PDCCH indicates a new UL or DL transmission for the MAC entity
4) 'drx-RetransmissionTimerDL' (per DL HARQ process): the maximum duration until a DL retransmission is received
5) 'drx-RetransmissionTimerUL' (per UL HARQ process): the maximum duration until a grant for UL retransmission is received).
6) 'drx-LongCycleStartOffset': the Long DRX cycle, and 'drx-StartOffset' which defines the subframe where the Long DRX and Short DRX Cycle starts
7) 'drx-ShortCycle' (optional): Short DRX cycle
8) 'drx-ShortCycleTimer' (optional): the duration the UE shall follow the Short DRX cycle
9) 'drx-HARQ-RTT-TimerDL' (per DL HARQ process): the minimum duration before a DL assignment for HARQ retransmission is expected by the MAC entity
10) 'drx-HARQ-RTT-TimerUL' (per UL HARQ process): the minimum duration before a UL HARQ retransmission grant is expected by the MAC entity Among the aforementioned parameters, multiple configurations may be applied only to a specific parameter (a parameter indicating a timer value related to a DRX on-duration or a parameter indicating an inactivity timer value, for example, 'drx-onDurationTimer', 'drx-InactivityTimer', etc.). For example, a network (including BS, eNB(evolved NodeB), ng-eNB(next generation eNode B), gNB(next generation NodeB), etc., hereinafter, simply referred to as a "network") may configure a plurality of values for 'drx-onDurationTimer' for the UE, and may instruct the UE to apply a specific value according to a situation of the UE.

In case of the on-duration, the network may reduce PDCCH monitoring by configuring a duration to be short, and may maintain a sleep operation to be relatively long.

As another example, the network may configure a plurality of values for the inactivity timer for the UE, and may instruct the UE to apply a specific value. Accordingly, similarly to the on-duration timer, the PDCCH monitoring may be increased/decreased in a situation where the inactivity timer runs, and a sleep duration may be decreased/increased. Alternatively, the network may configure a plurality of DRX cycles for the UE to adjust a cycle of the on-duration or adjust the sleep duration.

When multiple configurations are applied to a plurality of parameters (e.g., timer-related parameters), the network or the UE may assume that the remaining parameters (e.g., offset-related parameters) other than corresponding parameters (to which the multiple configurations are applied) are commonly applied to each configuration.

As one of methods for applying multiple configurations only to a specific parameter, values defined in the standard for the specific parameter may be considered as multiple configurations. For example, in the DRX configuration, 'drx-InactivityTimer' may have values shown in Table 6. Therefore, among the values shown in Table 6, valid values (e.g., ms0 to ms2560) may be considered as multiple configurations, and it may be instructed to apply a specific value by the method proposed below.

TABLE 6

| drx-InactivityTimer | ENUMERATED { ms0, ms1, ms2, ms3, ms4, ms5, ms6, ms8, ms10, ms20, ms30, ms40, ms50, ms60, ms80, ms100, ms200, ms300, ms500, ms750, ms1280, ms1920, ms2560, spare9, spare8, spare7, spare6, spare5, spare4, spare3, spare2, spare1}, |
|---|---|

<DRX Configuration Selection>

A network which has signaled multiple configurations for a DRX operation may instruct a UE to apply a specific configuration among the configurations according to the following method.

1. Implicit Indication

A. The DRX configuration may be an independent configuration according to a situation of a UE. In this case, the UE may follow a configuration defined in a corresponding situation without additional signaling (e.g., indicating a specific configuration index) in each situation.

B. For example, according to whether power is saved, a state of the UE may be divided into a power saving state and a normal state. When a state transition is achieved by a report of the UE or by an indication of the network, in the power saving state, a configuration for maintaining a sleep duration to be long may be defined as a default configuration. In the normal state in which the UE frequently transmits/receives data, an on-duration timer/inactivity timer may be maintained to be long, and a configuration with a short DRX cycle may be defined as a default configuration.

The UE may perform a DRX operation according to the default configuration described above. That is, the multiple DRX configurations proposed in the present disclosure may be associated with a specific UE state (e.g., a power saving state/mode, a normal state/mode) for each configuration.

Figure 23:
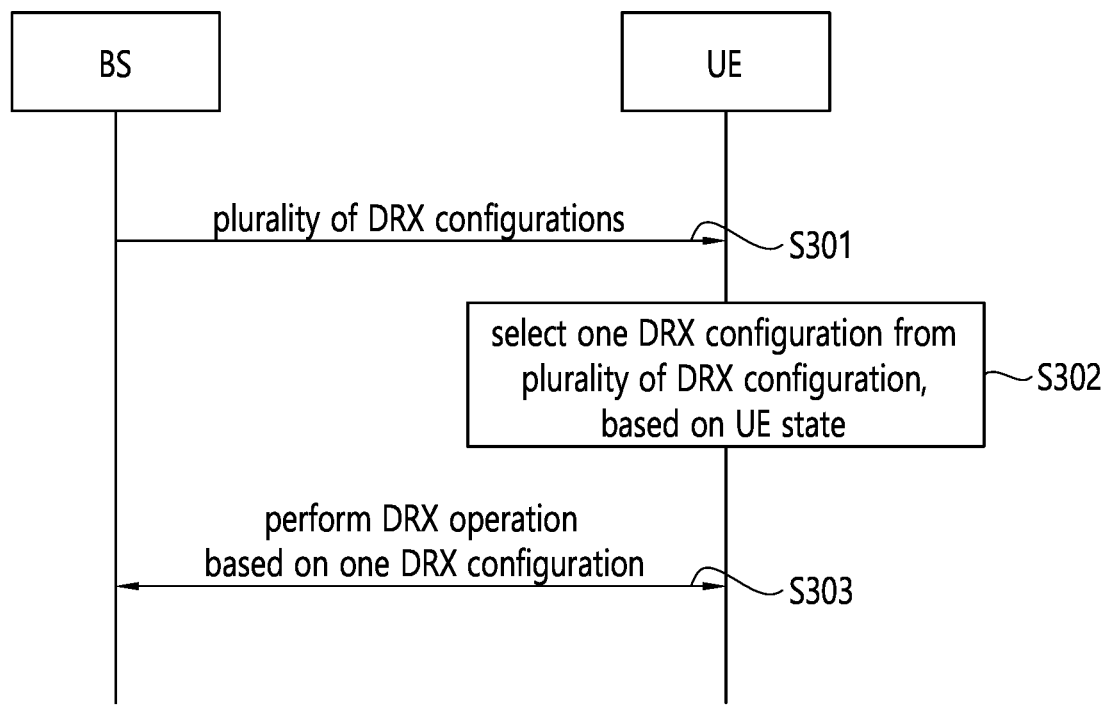
FIG. 23 illustrates a method for DRX operation of a UE, based on implicit indication.

FIG. 23 illustrates a method for DRX operation of a UE, based on implicit indication.

Referring to FIG. 23, a BS provides/configures a plurality of DRX configurations to the UE (S301). Each of the plurality of DRX configurations may include a plurality of parameters. At least one parameter may have a plurality of setting values.

In this case, the BS may report a DRX configuration (a specific parameter value) applicable depending on each state of the UE. The plurality of DRX configurations may be configured by a higher layer signal such as an RRC signal.

The UE may select one DRX configuration among the plurality of DRX configuration, based on a state thereof (S302).

For example, when in the power saving state, the UE may select a first configuration in which the sleep duration is maintained to be long. When in the normal state in which the UE frequently transmits/receives data, the UE may maintain an on-duration timer/inactivity timer to be long or may select a second configuration in which a DRX cycle is set to be short.

Herein, the first configuration and the second configuration may be configurations in which only a value of a specific parameter is different among the plurality of parameters. For example, the second configuration may be a configuration in which only the specific parameter (e.g., a parameter related to an on-duration or inactive duration, but this is for exemplary purposes only, and thus obviously, other parameters such as parameters related to retransmission can be used) is changed in the first configuration. That is, it can be regarded that the first configuration is when a value of a specific parameters is applied as a first value in a DRX configuration including a plurality of parameters, and the second configuration is when the value of the specific parameter is changed from the first value to a second value in the DRX configuration.

The UE performs a DRX operation based on the one DRX configuration (S303). When the state of the UE changes, an appropriate DRX configuration can be selected and applied without having to wait for explicit signaling of a BS, thereby enabling dynamic and adaptive DRX operation. In addition, since a specific parameter of the DRX configuration is applicable after changing to an appropriate value according to the state of the UE, the dynamic and adaptive DRX operation is possible.

2. Explicit Indication

A. The network may instruct to apply a specific configuration for the UE among predefined or signaled DRX configurations by using explicit signaling (e.g., RRC, DCI, MAC CE).

B. The network may indicate the DRX configuration for the UE, by using L1/L2 signaling having a relatively low decoding latency.

Figure 24:
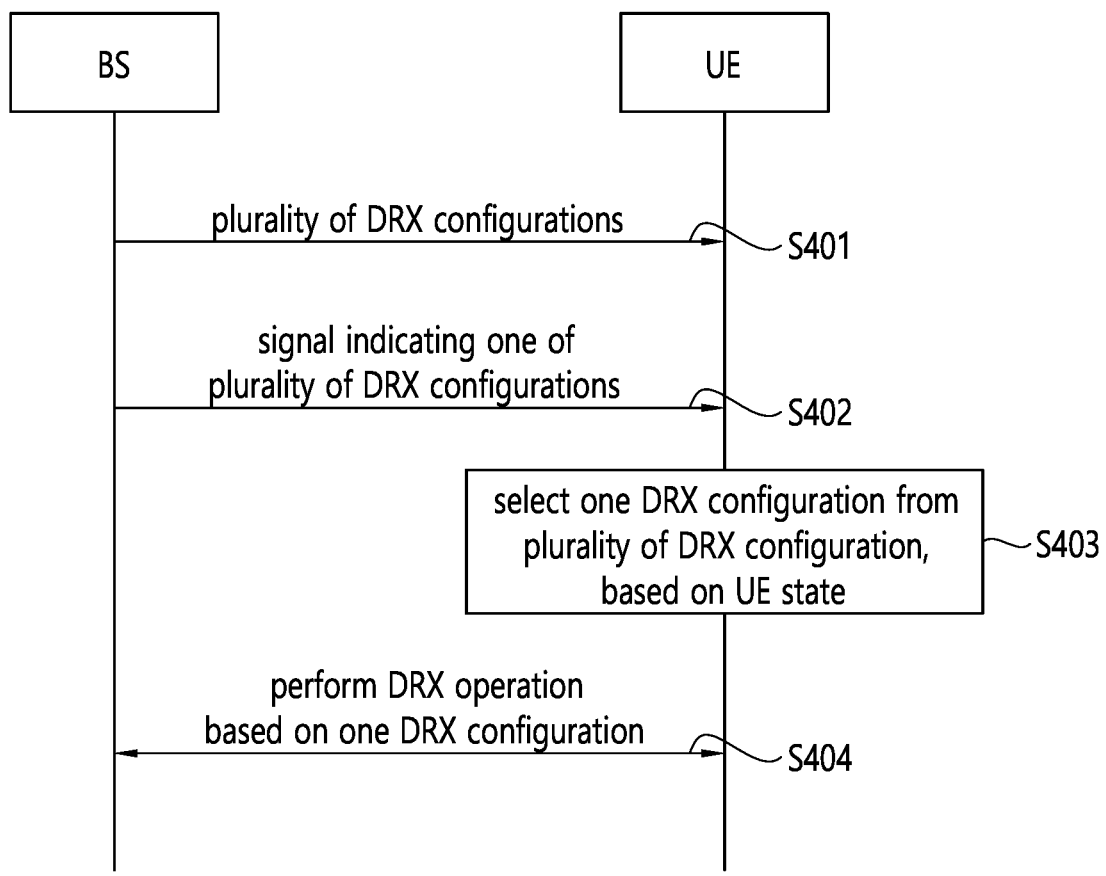
FIG. 24 illustrates a method for DRX operation of a UE, based on explicit indication.

FIG. 24 illustrates a method for DRX operation of a UE, based on explicit indication.

Referring to FIG. 24, a BS provides/configures a plurality of DRX configurations to the UE (S401). Each of the plurality of DRX configurations may include a plurality of parameters. At least one parameter may have a plurality of setting values.

The BS transmits a signal indicating one of the plurality of DRX configurations through a lower layer signal (e.g., a physical layer signal) having a relatively low decoding latency (S402).

The UE may select one DRX configuration among the plurality of DRX configurations, based on the signal (S403).

The UE performs a DRX operation based on the one DRX configuration (S404). Since this method dynamically changes the DRX configuration according to an explicit indication of the BS, there is a low possibility of misunderstanding or ambiguity for the DRX configuration between the BS and the UE.

<DRX Operation Based on Selected Configuration>

When a specific DRX configuration is determined by the aforementioned method, it is proposed that a UE determines a time point at which the configuration is applied as follows.

Figure 25:
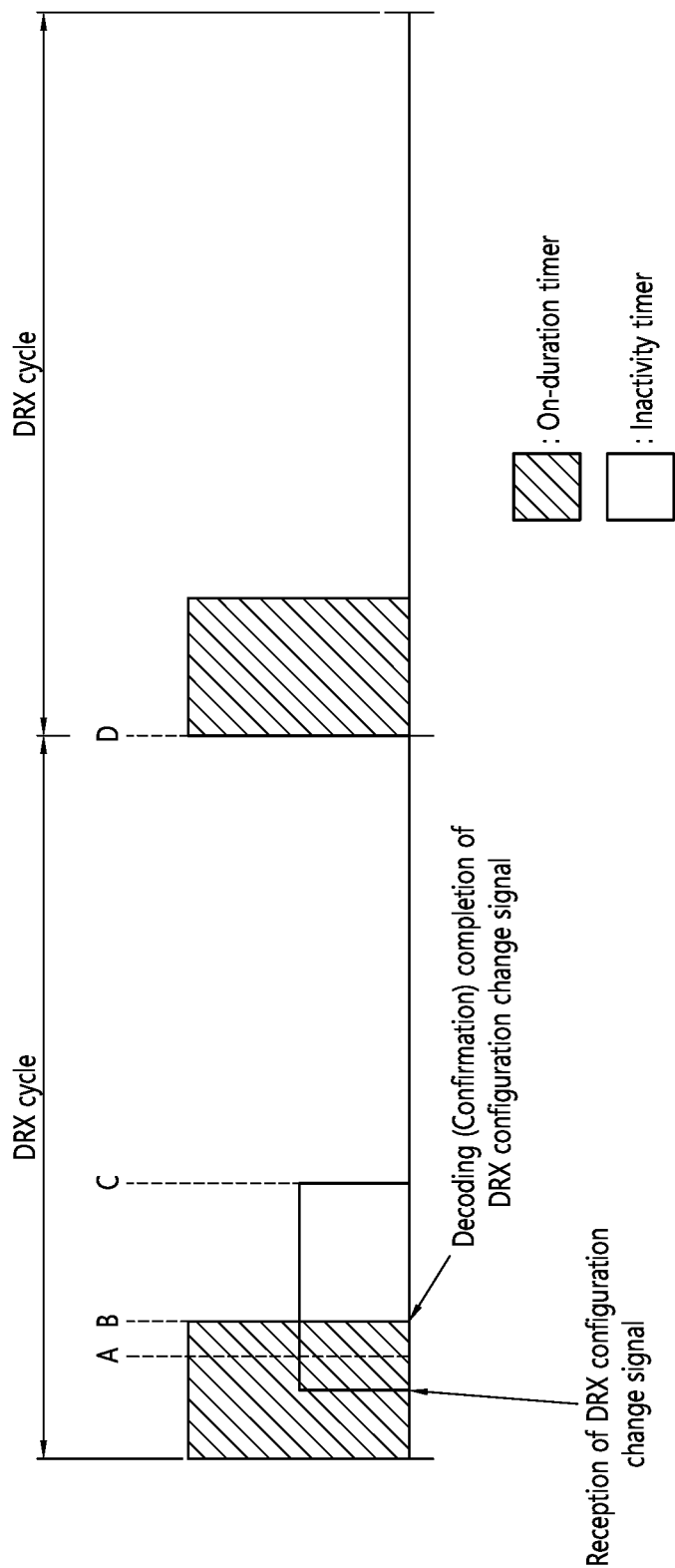
FIG. 25 illustrates a time relationship in regards to reception of a configuration change signal and an application thereof.

FIG. 25 illustrates a time relationship in regards to reception of a configuration change signal and an application thereof.

Referring to FIG. 25, a point "A" refers to a time point at which a UE has completed decoding of the configuration change signal indicating whether there is a configuration change. Alternatively, for the same understanding with a network, it may refer to a time point elapsed by a specific time after signaling of the configuration change signal, and may be considered to change or apply a fast DRX configuration. That is, the DRX configuration of the UE may be changed at the point "A". A DRX configuration before the change may be used up to the point "A" for the UE.

That is, when a DRX configuration change signal indicating a change of the DRX configuration is received within an active time, a second DRX configuration may be applied from a time point at which decoding of the DRX configuration change signal is complete or a time point elapsed by a specific time from a time point at which the DRX configuration change signal is received.

A point "B" refers to a case where a default configuration is maintained for an on-duration, and may be useful when additional control signaling is possible in addition to a configuration change signal within the duration. That is, the DRX configuration of the UE may be changed at the point "B", and a DRX configuration before the change may be used up to the point "B" for the UE.

That is, if the DRX configuration change signal indicating the change of the DRX configuration is received within the active time, the second DRX configuration may be applied from a time point at which a DRX on-duration ends during the active time.

A point "C" refers to a case where signal transmission/reception in a corresponding DRX cycle is complete by using the existing configuration. That is, the DRX configuration of the UE may be changed at the point "C". A DRX configuration before the change may be used up to the point "C" for the UE.

That is, when the DRX configuration change signal indicating the change of the DRX configuration is received within the active time, the second DRX configuration may be applied from a time point at which the active time ends.

The point "A", "B", or "C" may refer to a case where a starting position of a DRX cycle of a new configuration is changed to the point. That is, when the DRX configuration of the UE is changed at the point "A", "B", or "C", the point "A", "B", or "C may be a starting time point of the DRX cycle of the new DRX configuration for each case.

A point "D" may refer to a case where the default configuration is maintained up to a corresponding DRX cycle, and a new configuration is applied from a next DRX cycle. Herein, the next DRX cycle may be determined by a pre-configured first DRX configuration or parameter set, or may be determined by a second DRX configuration or parameter set indicated by the BS or reported by the UE through a configuration change signal.

That is, when the DRX configuration change signal indicating the change of the DRX configuration is received within an active time of a first DRX cycle, the second DRX configuration may be applied from a second DRX cycle next to the first DRX cycle.

A time point at which the new configuration is to be applied may be determined according to whether it is possible to change a DRX cycle (starting time point and duration) and a parameter related to an on-duration timer.

For example, the following operations may be applied.

1. When a DRX configuration is changed in DRX On, and is changed to DRX Off after the change, 1) When an inactivity timer is running in previous DRX On, it is possible that: i) a UE follows the previous DRX parameter until current DRX On, and may apply a new DRX configuration from next DRX On of a new DRX parameter; or ii) DRX Off is applied from a determined time point for applying the new DRX configuration. Some or all of the timers may stop. The timer may include 'drx-OnDurationTimer' and/or 'drx-InactivityTimer'.

2) When the inactivity timer does not run in the previous DRX On, it is possible that: i) the UE follows the previous DRX On until the current DRX On, and applies the new DRX configuration from the next DRX On of the new DRX parameter; or ii) DRX Off is applied from a determined time point for applying the new DRX configuration. Some or all of the timers may stop. The timer may include 'drx-OnDurationTimer' and/or 'drx-InactivityTimer'.

3) DRX On may be maintained when the inactivity timer runs, and DRX Off may be applied when the inactivity timer does not run or only the on-duration timer runs.

2. When a DRX configuration is changed in DRX On, and DRX On is maintained even after the change, 1) A UE may follow the previous DRX On until current DRX On, and may apply a new DRX configuration from next DRX On of a new DRX parameter.

2) The UE may apply the new DRX parameter from the current DRX On. In this case, it is possible that: i) an on-duration timer restarts after a determined change is reset; ii) only a threshold is changed without having to reset the on-duration timer; iii) the inactivity timer restarts after the determined change is reset; or iv) only the threshold is changed without having to reset the inactivity timer.

In the embodiments above, the DRX On may refer to a duration in which 'drx-OnDurationTimer' is running. Alternatively, it may be a DRX active time (a duration in which the UE can performing PDCCH monitoring).

The DRX Off may refer to a portion except for a DRX On region in the DRX cycle. For example, if the DRX On corresponds to an active time in FIG. 21, the DRX Off may refer to a sleep duration.

Signaling for DRX adaptation may be preferably expected by the UE only at a time point at which the DRX On is guaranteed before/after the change.

The operation of the aforementioned proposal or disclosure has been described in terms of the "UE" or "network", but may also be performed or implemented by a transmitting or receiving device, (digital signal) processor, microprocessor, or the like described below, instead of the "UE" and the "network. In addition, the "UE" is a general term, and may be used interchangeably with a device having mobility such as a mobile station (MS), a user equipment (UE), a mobile terminal, or the like. The "network" is a general term, and may be used interchangeably with a device such as a base station (BS), an evolved NodeB (eNB), a next generation eNodeB (ng-eNB), a next generation NodeB (gNB), or the like.

Since the examples of the above-described proposed method may also be included as one of the implementation methods of the present disclosure, it will be apparent that the examples of the above-described proposed method can be considered as types of proposed methods. Additionally, although the above-described proposed methods may be independently implemented (or embodied), the implementation may also be carried out in a combined (or integrated) form of part of the proposed methods. Herein, rules may be defined so that information on the application or non-application of the proposed methods (or information on the rules of the proposed methods) can be notified to a UE, by a base station, or to a receiving UE, by a transmitting UE, through a predefined signal (e.g., physical layer signal or high layer signal). In addition, the proposed method described in the embodiment of the present disclosure and methods that can be extended from the method can be implemented as a device, and the present disclosure also includes a description on a device implementing the proposed method. The description of the device will be described below.

Figure 26:
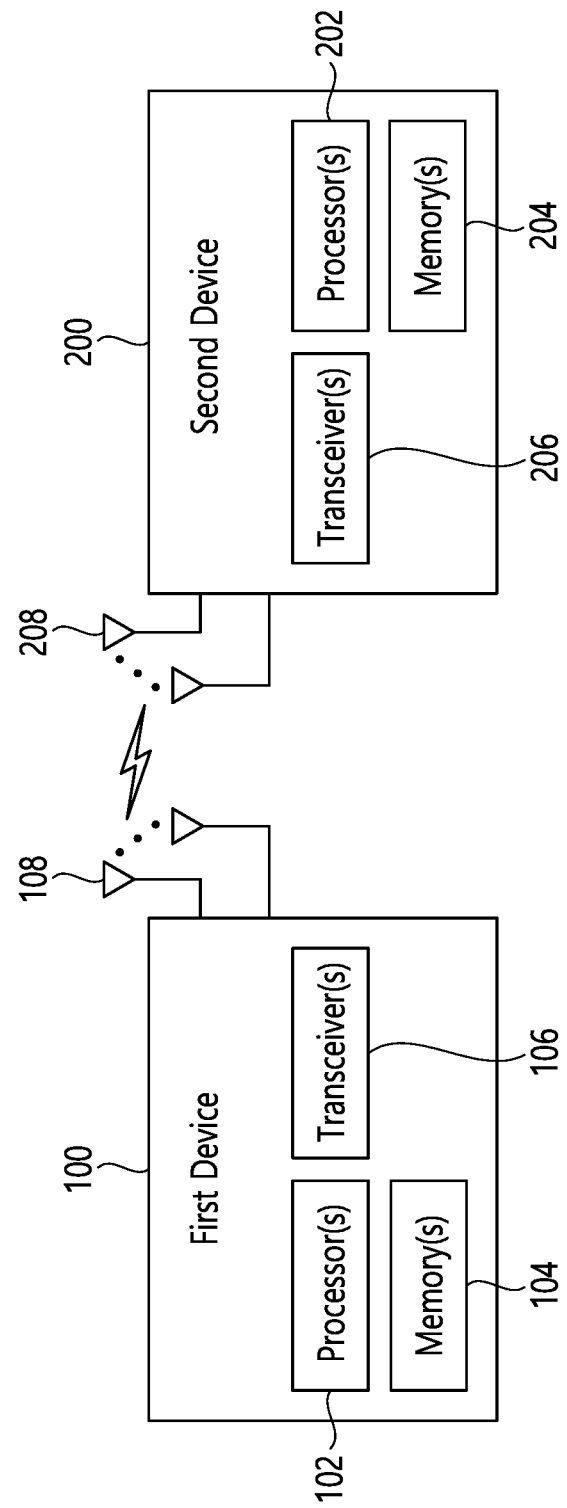
FIG. 26 illustrates a wireless device applicable to the present disclosure.

FIG. 26 illustrates a wireless device applicable to the present specification.

Referring to FIG. 26, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 27:
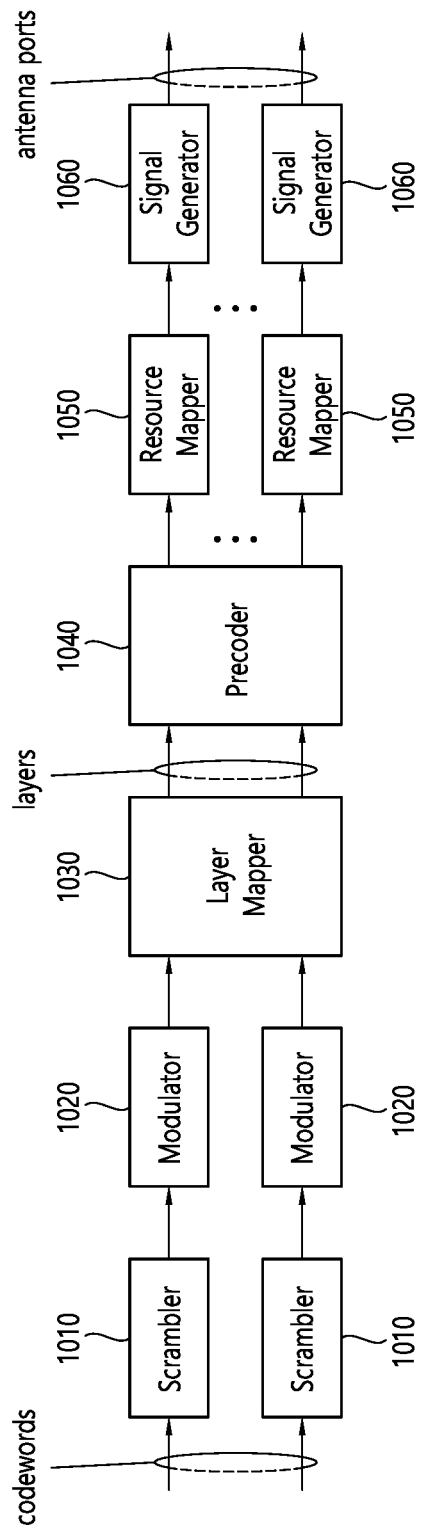
FIG. 27 illustrates a signal processing circuit for a transmission signal.

FIG. 27 illustrates a signal processing circuit for a transmission signal.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 27. For example, the wireless devices (e.g., 100 and 200 of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 28:
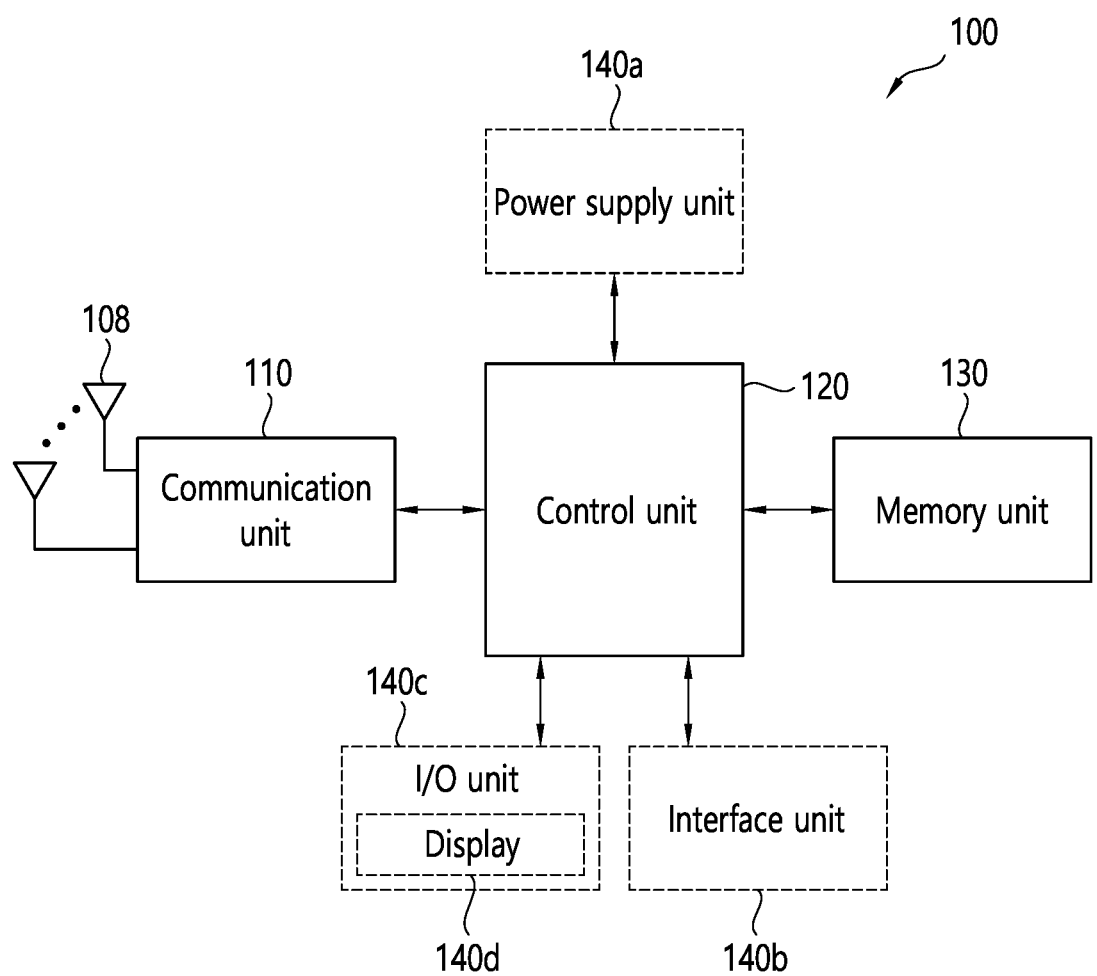
FIG. 28 illustrates a hand-held device applicable to the present disclosure.

FIG. 28 illustrates a hand-held device applicable to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 29, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Although not shown in FIG. 28, various components such as a camera, a universal serial bus (USB) port, or the like may be additionally included in the UE. For example, the camera may be connected with the processor.

The UE may perform a network access procedure to perform the procedure and/or methods described/proposed above. For example, the UE may receive system information and configuration information required to perform the procedure and/or methods described/proposed above and may store the information in a memory, while accessing the network (e.g., BS). The configuration information required in the present disclosure may be received through higher layer (e.g., RRC layer; medium access control, MAC, layer, etc.) signaling.

Figure 29:
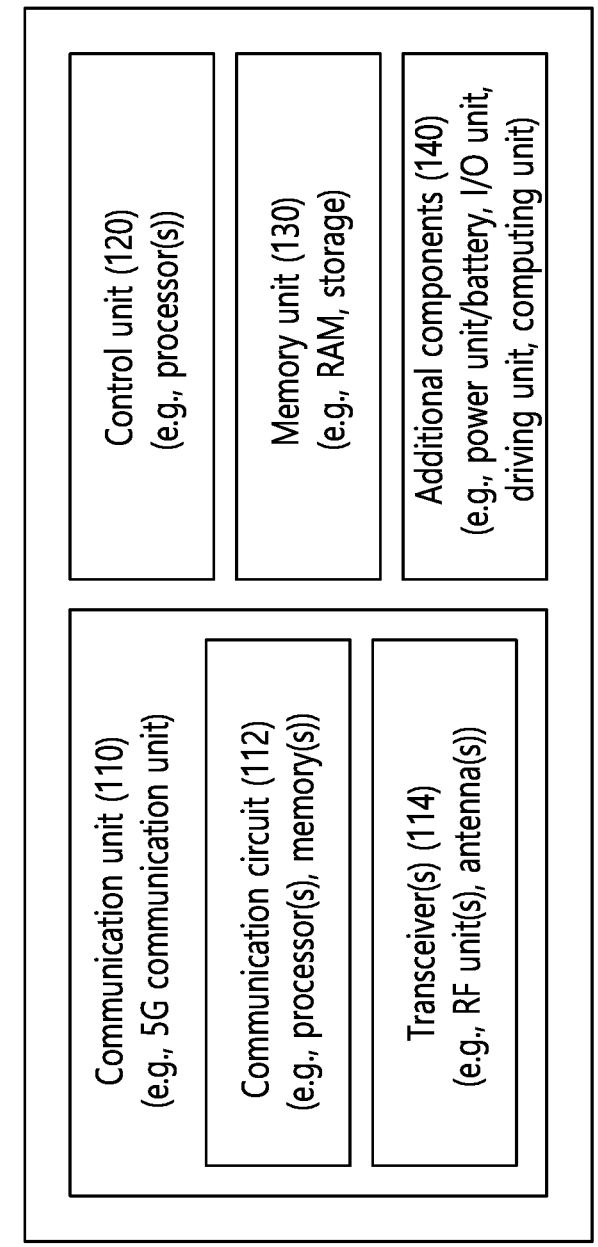
FIG. 29 shows another example of a wireless device applied to the present specification.

FIG. 29 shows another example of a wireless device applied to the present disclosure. The wireless device may be implemented in various forms according to a use-case/service.

Referring to FIG. 29, wireless devices 100 and 200 may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 30), the vehicles (100b-1 and 100b-2 of FIG. 30), the XR device (100c of FIG. 30), the hand-held device (100d of FIG. 30), the home appliance (100e of FIG. 30), the IoT device (100f of FIG. 30), a digital broadcast terminal, a hologram device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 30:
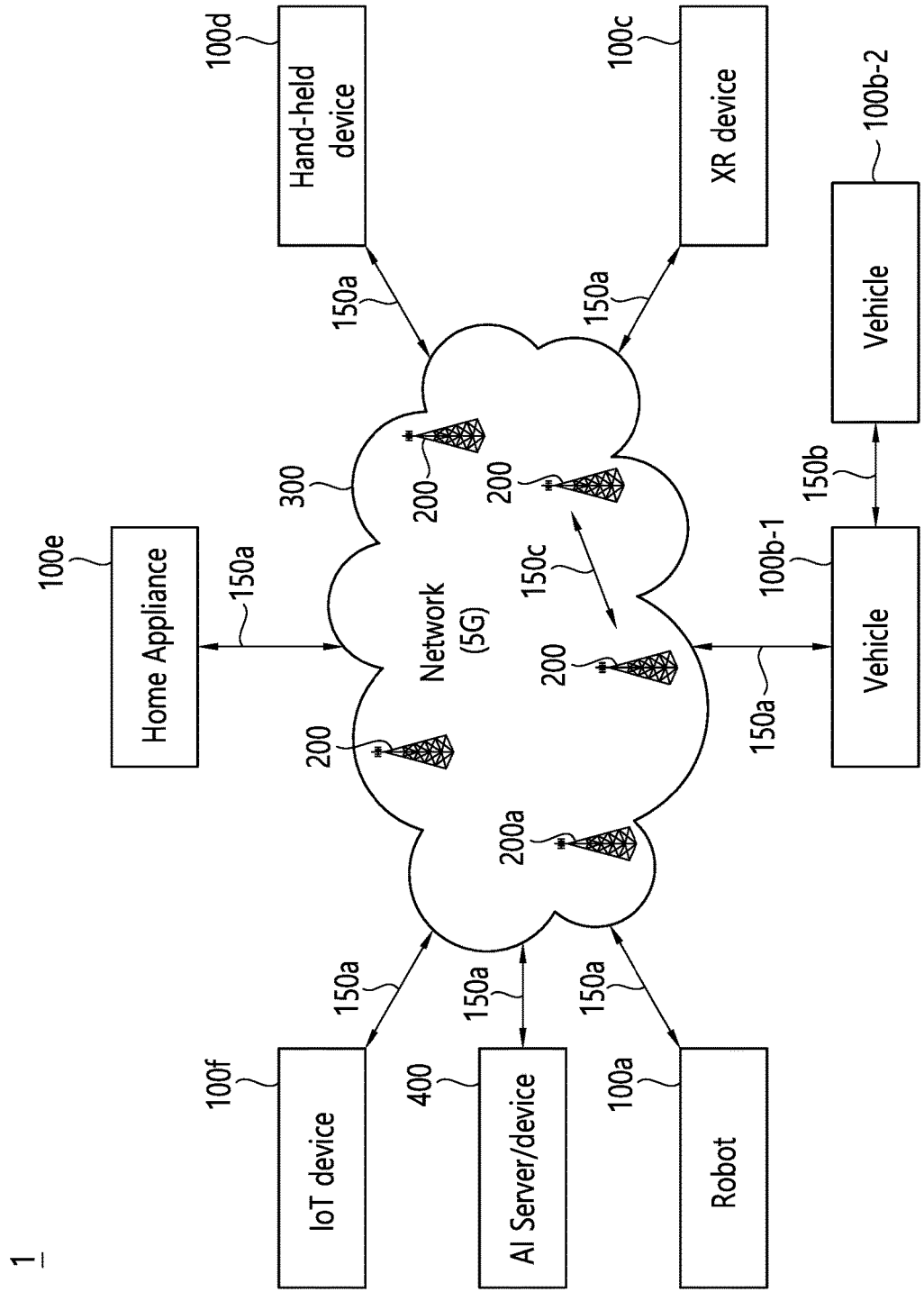
FIG. 30 illustrates a communication system 1 applied to the present specification.

FIG. 30 illustrates a communication system 1 applied to the present specification.

Referring to FIG. 30, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 7

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 8

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method for a discontinuous reception (DRX) operation of a user equipment (UE) in a wireless communication system, the method comprising:
   receiving a first DRX configuration for a first DRX group of a first set of serving cells from a network;
   receiving a second DRX configuration for a second DRX group of a second set of serving cells from the network; and
   performing the DRX operation based on one DRX configuration among the first DRX configuration and the second DRX configuration,
   wherein the first DRX configuration comprises i) a first drx-onDurationTimer which is related to a duration at a beginning of a DRX cycle, ii) a first drx-InactivityTimer which is related to a duration after a physical downlink control channel (PDCCH) occasion in which a PDCCH indicates a new uplink or downlink transmission, and iii) other parameters which are related to the DRX operation,
   wherein the second DRX configuration comprises only i) a second drx-onDurationTimer which is related to a duration at a beginning of a DRX cycle and ii) a second drx-InactivityTimer which is related to a duration after a PDCCH occasion in which a PDCCH indicates a new uplink or downlink transmission, among DRX related parameters, and
   wherein the other parameters, which are related to the DRX operation in the first DRX configuration, are common to and have the same values for the first DRX group and the second DRX group.

2. The method of claim 1, wherein the other parameters which are related to the DRX operation in the first DRX configuration comprise a parameter related to a long DRX cycle and an offset which defines a subframe where a long and short DRX cycle starts.

3. A user equipment (UE) comprising:
   at least one transceiver transmitting and receiving a radio signal;
   at least one memory; and
   at least one processor operatively connectable to the at least one transceiver and the at least one memory, wherein the at least one memory stores instructions that, based on being executed by the at least one processor, cause the at least one processor to perform operations comprising:
   receiving a first discontinuous reception (DRX) configuration for a first DRX group of a first set of serving cells from a network;
   receiving a second DRX configuration for a second DRX group of a second set of serving cells from the network; and
   performing a DRX operation based on one DRX configuration among the first DRX configuration and the second DRX configuration,
   wherein the first DRX configuration comprises i) a first drx-onDurationTimer which is related to a duration at a beginning of a DRX cycle, ii) a first drx-InactivityTimer which is related to a duration after a physical downlink control channel (PDCCH) occasion in which a PDCCH indicates a new uplink or downlink transmission, and iii) other parameters which are related to the DRX operation,
   wherein the second DRX configuration comprises only i) a second drx-onDurationTimer which is related to a duration at a beginning of a DRX cycle and ii) a second drx-InactivityTimer which is related to a duration after a PDCCH occasion in which a PDCCH indicates a new uplink or downlink transmission, among DRX related parameters, and
   wherein the other parameters, which are related to the DRX operation in the first DRX configuration, are common to and have the same values for the first DRX group and the second DRX group.

4. The UE of claim 3, wherein the other parameters which are related to the DRX operation in the first DRX configuration comprises a parameter related to a long DRX cycle and an offset which defines a subframe where a long and short DRX cycle starts.

5. A processor for a wireless communication device, configured to control the wireless communication device to:
   receive a first discontinuous reception (DRX) configuration for a first DRX group of a first set of serving cells from a network;
   receive a second DRX configuration for a second DRX group of a second set of serving cells from the network; and
   perform the DRX operation based on one DRX configuration among the first DRX configuration and the second DRX configuration,
   wherein the first DRX configuration comprises i) a first drx-onDurationTimer which is related to a duration at a beginning of a DRX cycle, ii) a first drx-InactivityTimer which is related to a duration after a physical downlink control channel (PDCCH) occasion in which a PDCCH indicates a new uplink or downlink transmission, and iii) other parameters which are related to the DRX operation,
wherein the second DRX configuration comprises only i) a second drx-onDurationTimer which is related to a duration at a beginning of a DRX cycle and ii) a second drx-InactivityTimer which is related to a duration after a PDCCH occasion in which a PDCCH indicates a new uplink or downlink transmission, among DRX related parameters, and
wherein the other parameters, which are related to the DRX operation in the first DRX configuration, are common to and have the same values for the first DRX group and the second DRX group.

* * * * *